(12) United States Patent
Pan et al.

(10) Patent No.: US 12,730,283 B2
(45) Date of Patent: Sep. 8, 2026

(54) CAMERA OPTICAL LENS

(71) Applicant: Changzhou AAC Raytech Optronics Co., Ltd., Changzhou City (CN)

(72) Inventors: Lu Pan, Changzhou (CN); Shunda Zhou, Changzhou (CN); Shijia Zhao, Changzhou (CN); Zhen Huang, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 225 days.

(21) Appl. No.: 18/764,136

(22) Filed: Jul. 3, 2024

(65) Prior Publication Data

US 2025/0327992 A1 Oct. 23, 2025

(30) Foreign Application Priority Data

Apr. 19, 2024 (CN) ........................ 202410484596.0

(51) Int. Cl.
*G02B 13/00* (2006.01)
*G02B 1/04* (2006.01)
*G02B 9/64* (2006.01)

(52) U.S. Cl.
CPC ........... *G02B 13/0045* (2013.01); *G02B 1/04* (2013.01); *G02B 9/64* (2013.01); *G02B 13/0055* (2013.01)

(58) Field of Classification Search
CPC ............ G02B 13/0045; G02B 13/0055; G02B 13/00; G02B 13/06; G02B 13/18; G02B 1/04; G02B 1/00; G02B 9/64
See application file for complete search history.

(56) References Cited

U.S. PATENT DOCUMENTS

| | | | | |
|---|---|---|---|---|
| 11,314,059 | B2 * | 4/2022 | Bian | G02B 13/0045 |
| 12,204,077 | B2 * | 1/2025 | Teranishi | G02B 9/64 |
| 2020/0209562 | A1 * | 7/2020 | Zhao | G02B 9/64 |
| 2020/0209565 | A1 * | 7/2020 | Guo | G02B 27/005 |
| 2020/0409058 | A1 * | 12/2020 | Oinuma | G02B 9/64 |
| 2020/0409060 | A1 * | 12/2020 | Oinuma | G02B 27/0012 |
| 2020/0409103 | A1 * | 12/2020 | Bian | G02B 13/0045 |
| 2021/0263275 | A1 * | 8/2021 | Yang | G02B 13/0045 |
| 2021/0263282 | A1 * | 8/2021 | Zhou | G02B 13/06 |

(Continued)

*Primary Examiner* — Christopher E Leiby
(74) *Attorney, Agent, or Firm* — Wiersch Law Group

(57) ABSTRACT

The present disclosure relates to the field of optical lenses, and discloses a camera optical lens. The camera optical lens sequentially includes seven lenses from an object-side surface to an image side: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power; and the following relational expressions are satisfied: $0.20 \leq H0.6r9/IH \leq 0.30$; $16.00 \leq f1/H0.6r1*\tan(\text{semi-FOV}) \leq 30.00$; $-6.00 \leq (H0.6r14/d13)*(f7/f) \leq -3.00$. The camera optical lens has excellent imaging performance, meets the design requirements of wide-angle, low sensitivity, good processability, miniaturization and sufficient correction of aberration, and is particularly suitable for a mobile phone camera lens assembly composed of camera elements such as CCD CMOS with high definition, a WEB camera lens assembly and a vehicle-mounted lens assembly.

20 Claims, 9 Drawing Sheets

(56) References Cited

U.S. PATENT DOCUMENTS

2021/0364742 A1* 11/2021 Teranishi ................. G02B 9/64
2021/0364747 A1* 11/2021 Teranishi ............... G02B 13/18
2021/0364748 A1* 11/2021 Yamazaki .......... G02B 13/0045
2021/0389566 A1* 12/2021 Yamazaki .......... G02B 27/0025
2021/0389568 A1* 12/2021 Yamazaki ................ G02B 9/64
2022/0011549 A1* 1/2022 Peng ...................... G02B 13/06
2022/0035134 A1* 2/2022 Ding .................. G02B 13/0045
2022/0137345 A1* 5/2022 Yang ...................... G02B 13/06
359/755
2022/0137349 A1* 5/2022 Wang ....................... G02B 9/64
359/708
2022/0171164 A1* 6/2022 Nitta ........................ G02B 9/64
2022/0171165 A1* 6/2022 Teranishi ........... G02B 13/0045
2022/0171167 A1* 6/2022 Teranishi ................. G02B 9/64
2022/0206255 A1* 6/2022 Nitta .................. G02B 13/0045
2022/0206259 A1* 6/2022 Nitta ........................ G02B 9/64
2022/0206265 A1* 6/2022 Nitta ........................ G02B 9/64
2022/0206269 A1* 6/2022 Nitta ........................ G02B 9/64
2022/0206271 A1* 6/2022 Teranishi ........... G02B 27/0025
2022/0317417 A1* 10/2022 Yan .................... G02B 13/0045
2023/0085840 A1* 3/2023 Peng ........................ G02B 9/62
359/757
2023/0087761 A1* 3/2023 Sun .......................... G02B 9/64
359/708
2023/0091029 A1* 3/2023 Liu .......................... G02B 9/64
359/708
2023/0185058 A1* 6/2023 Yan .................... G02B 13/0045
359/755

* cited by examiner

CAMERA OPTICAL LENS

TECHNICAL FIELD

The present disclosure relates to the field of optical lens and, in particular, to a camera optical lens applicable to handheld terminal devices such as smart phones, digital cameras, and camera devices such as monitors and PC lenses, vehicle-mounted lenses.

BACKGROUND

In recent years, with the rise of various smart devices, the demand for a miniaturized camera optical lens has gradually increased, and since the pixel size of the optical sensor is reduced, and the current electronic product has a development trend of light weight, thin and portable, the miniaturized camera optical lens with good imaging quality has become the mainstream of the current market. In order to obtain better imaging quality, a multi-lens structure is mostly used. In addition, with the development of technology and the increase of diversified requirements of users, under the condition that the pixel area of the photosensitive device is continuously reduced and the requirements on the imaging quality of the system are continuously improved, the structure with seven lenses gradually appears in the lens design. There is an urgent need for a wide-angle camera optical lens having excellent imaging performance, low sensitivity, good processability, miniaturization, and sufficiently corrected aberration.

SUMMARY

In view of the above problems, the object of the present disclosure is to provide a camera optical lens having excellent imaging performance and satisfying design requirements of wide-angle, low sensitivity, good processability, miniaturization and sufficient correction of aberration.

In order to achieve the above object, the technical solution of the present disclosure provides a camera optical lens, the camera optical lens sequentially includes seven lenses from an camera optical lens to an image side: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power.

An object-side surface of the first lens is convex in a paraxial region, and an image-side surface of the first lens is concave in the paraxial region; an object-side surface of the second lens is convex in the paraxial region, and an image-side surface of the second lens is concave in the paraxial region; an object-side surface of the third lens is concave in the paraxial region, and an image-side surface of the third lens is concave in the paraxial region; an object-side surface of the fourth lens is convex in the paraxial region, and an image-side surface of the fourth lens is convex in the paraxial region; an object-side surface of the fifth lens is convex in the paraxial region, and an image-side surface of the fifth lens is concave in the paraxial region; an object-side surface of the sixth lens is convex in the paraxial region, and an image-side surface of the sixth lens is convex in the paraxial region; an object-side surface of the seventh lens is convex in the paraxial region, and an image-side surface of the seventh lens is concave in the paraxial region.

The camera optical lens has a focal length of f, the first lens has a focal length of f1, the second lens has a focal length of f2, the third lens has a focal length of f3, the fourth lens has a focal length of f4, the fifth lens has a focal length of f5, the seventh lens has a focal length of f7, the object-side surface of the second lens has a central curvature radius of R3 the image-side surface of the second lens has a central curvature radius of R4, the object-side surface of the fifth lens has a central curvature radius of R9 the image-side surface of the fifth lens has a central curvature radius of R10, fifth lens has an on-axis thickness of d9, the seventh lens has an on-axis thickness of d13, a radial height of the intersection point between a chief ray of 0.6 field of view of the camera optical lens and the object-side surface of the first lens is H0.6r1, a radial height of the intersection point between a chief ray of 0.6 field of view of the camera optical lens and the object-side surface of the fifth lens is H0.6r9, a radial height of the intersection point between a chief ray of 0.6 field of view of the camera optical lens and the image-side surface of the seventh lens is H0.6r14, an image height of the 1.0 field of view of the camera optical lens is IH, and half of the 1.0 field of view of the camera optical lens is semi-FOV, and the following relational expressions are satisfied:

$$5.00 \le (f4 - f5)/f1 \le 12.00;$$

$$2.10 \le (R3 + R4)/f \le 3.50;$$

$$20.00 \le (R9 + R10)/d9 \le 40.00;$$

$$-9.00 \le (f2 - f3)/f \le -3.00;$$

$$0.20 \le H0.6r9/IH \le 0.30;$$

$$16.00 \le f1/H0.6r1 * \tan(\text{semi}-FOV) \le 30.00;$$

$$-6.00 \le (H0.6r14/d13) * (f7/f) \le -3.00.$$

As an improvement, the following relational expression is satisfied:

$$2.10 \le (R3 + R4)/f \le 2.90.$$

As an improvement, the following relational expression is satisfied: $-7.70 \le (f2-f3)/f \le -3.00$.

As an improvement, the following relational expression is satisfied:

$$19.00 \le f1/H0.6r1 * \tan(\text{semi} - FOV) \le 25.50.$$

As an improvement, the following relational expression is satisfied: $-5.30 \le (H0.6r14/d13)*(f7/f) \le -3.70$.

As an improvement, the sixth lens has a focal length of f6 and the following relational expression is satisfied: $-1.80 \le f6/f7 \le -0.90$.

As an improvement, the following relational expression is satisfied: $-1.55 \le f6/f7 \le -1.10$.

As an improvement, the first lens is made of glass material.

The technical solution of the present disclosure further provides a camera optical lens, the camera optical lens sequentially includes seven lenses, and the seven lenses from an object side to an image side are: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power.

An object-side surface of the first lens is convex in a paraxial region, and an image-side surface of the first lens is concave in the paraxial region; an object-side surface of the second lens is convex in the paraxial region, and an image-side surface of the second lens is concave in the paraxial region; an object-side surface of the third lens is concave in the paraxial region, and an image-side surface of the third lens is concave in the paraxial region; an object-side surface of the fourth lens is convex in the paraxial region, and an image-side surface of the fourth lens is convex in the paraxial region; an object-side surface of the fifth lens is convex in the paraxial region, and an image-side surface of the fifth lens is concave in the paraxial region; an object-side surface of the sixth lens is convex in the paraxial region, and an image-side surface of the sixth lens is convex in the paraxial region; an object-side surface of the seventh lens is convex in the paraxial region, and an image-side surface of the seventh lens is concave in the paraxial region.

The camera optical lens has a focal length of f, the first lens has a focal length of f1, the fifth lens has a focal length of f5, the seventh lens has a focal length of f7, the object-side surface of the first lens has a central curvature radius of R1, the image-side surface of the first lens has a central curvature radius of R2, the object-side surface of the third lens has a central curvature radius of R5, the image-side surface of the third lens has a central curvature radius of R6, the on-axis thickness from the image side of the second lens to the object side of the third lens is d4, the on-axis thickness of the third lens is d5, the on-axis thickness from the image side of the third lens to the object side of the fourth lens is d6, the on-axis thickness of the seventh lens is d13, the radial height of the intersection point between chief ray of 0.6 field of view of the camera optical lens and the object-side surface of the first lens is H0.6r1, the radial height of the intersection point between chief ray of 0.6 field of view of the camera optical lens and the object-side surface of the fifth lens is H0.6r9, the radial height of the intersection point between chief ray of 0.6 field of view of the camera optical lens and the image-side surface of the seventh lens is H0.6r14, the image height of the 1.0 field of view of the camera optical lens is IH, and half of the 1.0 field of view of the camera optical lens is semi-FOV, and the following relational expressions are satisfied:

$$0.20 \leq H0.6r9/IH \leq 0.30;$$

$$16.00 \leq f1/H0.6r1 * \tan(\text{semi}-FOV) \leq 30.00;$$

$$-6.00 \leq (H0.6r14/d13) * (f7/f) \leq -3.00;$$

$$0.21 \leq R1/R2 \leq 0.42;$$

$$0.30 \leq d5/(d4+d6) \leq 0.55;$$

$$-3.45 \leq R5/R6 \leq -0.20;$$

$$-11.60 \leq f5/f \leq -3.00.$$

As an improvement, the following relational expression is satisfied:

$$0.25 \leq R1/R2 \leq 0.35.$$

As an improvement, the following relational expression is satisfied:

$$0.35 \leq d5/(d4+d6) \leq 0.45.$$

As an improvement, the following relational expression is satisfied: $-2.85 \leq R5/R6 \leq -0.20$.

As an improvement, the following relational expression is satisfied: $-10.00 \leq f5/f \leq -3.50$.

As an improvement, the following relational expression is satisfied:

$$19.00 \leq f1/H0.6r1 * \tan(\text{semi}-FOV) \leq 25.50.$$

As an improvement, the following relational expression is satisfied: $-5.30 \leq (H0.6r14/d13)*(f7/f) \leq -3.70$.

As an improvement, the following relational expression is satisfied: $1.00 \leq f1/f \leq 1.40$.

As an improvement, the following relational expression is satisfied: $1.05 \leq f1/f \leq 1.25$.

As an improvement, the on-axis thickness of the first lens is d1, a total optical length from the object-side surface of the first lens to an image plane of the camera optical lens along an optic axis of the camera optical lens is TTL, and the following relational expression is satisfied: $0.09 \leq d1/TTL \leq 0.16$.

As an improvement, the following relational expression is satisfied:

$$0.10 \leq d1/TTL \leq 0.14.$$

As an improvement, the first lens is made of glass material.

The present disclosure has the following beneficial effects: The camera optical lens according to the present invention has excellent imaging performance, meets the design requirements of wide-angle, low sensitivity, good processability, miniaturization and sufficient correction of aberration, and is particularly suitable for a mobile phone camera lens assembly composed of camera elements such as CCD CMOS with high definition, a WEB camera lens assembly and a vehicle-mounted lens assembly.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
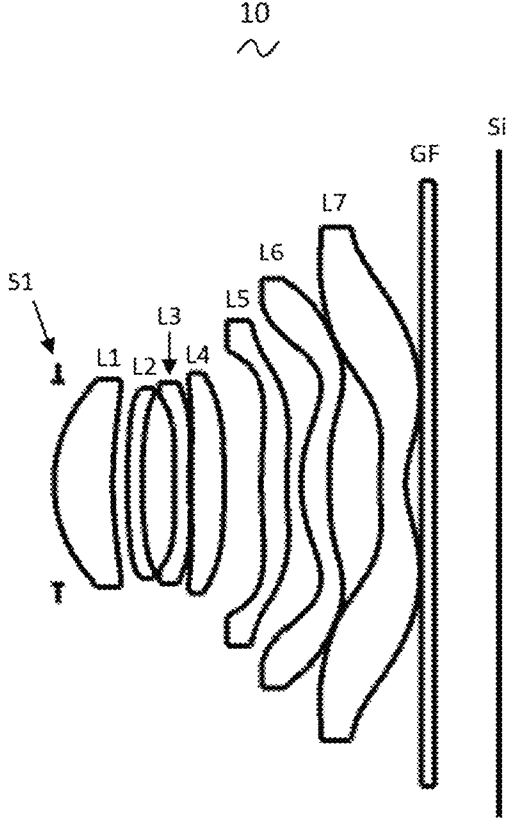
FIG. 1 is a structural schematic diagram of a camera optical lens according to Embodiment 1 of the present disclosure.

In order to more clearly illustrate objectives, technical solutions, and advantages of embodiments of the present disclosure, the technical solutions in embodiments of the present disclosure are clearly and completely described in details with reference to the accompanying drawings. However, those of ordinary skill in the art will appreciate that in various embodiments of the present disclosure, numerous technical details are set forth for the reader to better understand the present disclosure. However, even without these technical details and various variations and modifications based on the following embodiments, the technical solutions claimed in the present disclosure can be implemented.

Referring to FIGS. 1-16, the technical solution of the present disclosure provides camera optical lenses 10, 20, 30 and 40. FIG. 1, FIG. 5, FIG. 9, and FIG. 13 show camera optical lenses 10, 20, 30, and 40 according to the present disclosure, and the camera optical lenses 10, 20, 30, and 40 include seven lenses. The camera optical lens sequentially includes from an object side to an image side: a first lens L1, a second lens L2, a third lens L3, a fourth lens L4, a fifth lens L5, a sixth lens L6 and a seventh lens L7. An optical element such as a grating filter may be provided between the seventh lens L7 and an image-side surface Si.

The first lens L1 is made of glass material, the second lens L2 is made of plastic material, the third lens L3 is made of plastic material, the fourth lens L4 is made of plastic material, the fifth lens L5 is made of plastic material, the sixth lens L6 is made of plastic material, and the seventh lens L7 is made of plastic material. The glass and the resin lens are matched to reduce chromatic aberration and improve the performance of the camera optical lens. The lenses may also be made of other materials.

The object-side surfaces and the image-side surfaces of the first lens L1, the second lens L2, the third lens L3, the fourth lens L4, the fifth lens L5, the sixth lens L6, and the seventh lens L7 are aspheric surfaces.

An object-side surface of the first lens L1 is convex in a paraxial region, an image-side surface of the first lens L1 is concave in the paraxial region, and the first lens L1 has positive refractive power. The object-side surface and the image-side surface of the first lens L1 may also be provided with other concave and convex distributions.

An object-side surface of the second lens L2 is convex in the paraxial region, an image-side surface of the second lens L2 is concave in the paraxial region, and the first lens L2 has negative refractive power. The object-side surface and the image-side surface of the first lens L2 may also be provided with other concave and convex distributions.

An object-side surface of the third lens L3 is concave in a paraxial region, an image-side surface of the third lens L3 is concave in the paraxial region, and the third lens L3 has negative refractive power. The object-side surface and the image-side surface of the third lens L3 may also be provided with other concave and convex distributions.

An object-side surface of the fourth lens L4 is convex in the paraxial region, an image-side surface of the fourth lens L4 is convex in the paraxial region, and the fourth lens L4 has positive refractive power. The object-side surface and the image-side surface of the fourth lens L4 may also be provided with other concave and convex distributions.

An object-side surface of the fifth lens L5 is convex in a paraxial region, an image-side surface of the fifth lens L5 is concave in the paraxial region, and the fifth lens L5 has negative refractive power. The object-side surface and the image-side surface of the fifth lens L5 may also be provided with other concave and convex distributions.

An object-side surface of the sixth lens L6 is convex in a paraxial region, an image-side surface of the sixth lens L6 is convex in the paraxial region, and the sixth lens L6 has positive refractive power. The object-side surface and the image-side surface of the sixth lens L6 may also be provided with other concave and convex distributions.

An object-side surface of the seventh lens L7 is convex in a paraxial region, an image-side surface of the seventh lens L7 is concave in the paraxial region, and the seventh lens L7 has negative refractive power. The object-side surface and the image-side surface of the seventh lens L7 may also be provided with other concave and convex distributions.

A focal length of the first lens is defined as f1, a focal length of the fourth lens is defined as f4, a focal length of the fifth lens is defined as f5, and the following relational expression is satisfied: $5.00 \le (f4-f5)/f1 \le 12.00$. Within the range of the relational expression, it is beneficial to reasonably allocate the refractive power of the camera optical lens, so that the camera optical lens has good imaging quality and effectively reduces the sensitivity of the camera optical lens.

A central curvature radius of the object-side surface of the second lens is defined as R3 in the paraxial region, a central curvature radius of the image-side surface of the second lens is defined as R4 in the paraxial region, and a focal length of the camera optical lens is defined as f, and the following relational expression is satisfied: $2.10 \le (R3+R4)/f \le 3.50$. Within the range of the relational expression, the third-order coma difference of the system may be controlled within a reasonable range by reasonably controlling the ratio of the sum of the curvature radius of the object-side surface and the image-side surface of the second lens to the total effective focal length of the system, which is beneficial to balance the coma difference generated by the front lens of the optical imaging system, so that the system has good imaging quality. As an improvement, $2.10 \leq (R3+R4)/f \leq 2.90$.

A central curvature radius of the object-side surface of the fifth lens is defined as R9 in the paraxial region, a central curvature radius of the image-side surface of the fifth lens is defined as R10 in the paraxial region, an on-axis thickness of the fifth lens is defined as d9, and the following relational expression is satisfied: $20.00 \leq (R9+R10)/d9 \leq 40.00$. Within the range of the relational expression, the shape of the fifth lens is reasonably designed, and the turning angle of the light at the fifth lens is optimized, which is beneficial to achieve wide-angle.

The focal length of the camera optical lens is defined as f, a focal length of the second lens is defined as f2, a focal length of the third lens is defined as f3, and the following relational expression is satisfied: $-9.00 \leq (f2-f3)/f \leq -3.00$. Within the range of the relational expression, it is beneficial to reduce the sensitivity of decenter and thickness of the second lens, and improve the processability of the lens. As an improvement, $-7.70 \leq (f2-f3)/f \leq -3.00$.

A radial height of the intersection point between chief ray of 0.6 field of view of the camera optical lens and the object-side surface of the fifth lens is defined as H0.6r9, an image height of the 1.0 field of view of the camera optical lens is IH, and the following relational expression is satisfied: $0.20 \leq H0.6r9/IH \leq 0.30$. Within the range of the relational expression, the light has a reasonable turning angle from the fourth lens to the fifth lens by reasonably controlling the ratio of the radial height (the vertical distance to the optical axis) of the intersection point of chief ray of 0.6 field of view and the object-side surface of the fifth lens to the image height, which is beneficial to achieve wide-angle of the camera optical lens.

The focal length of the first lens is defined as f1, the radial height of the intersection point between chief ray of 0.6 field of view of the camera optical lens and the object-side surface of the fifth lens is defined as H0.6r9, half of a 1.0 field of view of the camera optical lens is semi-FOV, and the following relational expression is satisfied: $16.00 \leq f1/H0.6r1 * \tan(\text{semi-FOV}) \leq 30.00$. Within the range of the relational expression, the object-side surface of the first lens has a reasonable curvature by reasonably controlling the relationship between the radial height (the vertical distance to the optical axis) of the intersection point between chief ray of 0.6 field of view and the object-side surface of the first lens and the focal length of the first lens and the half field of view, which is beneficial to achieve wide-angle. As an improvement, $19.00 \leq f1/H0.6r1 * \tan(\text{semi-FOV}) \leq 25.50$.

The focal length of the camera optical lens is defined as f, a focal length of the seventh lens is defined as f7, an on-axis thickness of the seventh lens is defined as d13, the radial height of the intersection point between chief ray of 0.6 field of view of the camera optical lens and the image-side surface of the seventh lens is defined as H0.6r14, and the following relational expression is satisfied: $-6.00 \leq (H0.6r14/d13) * (f7/f) \leq -3.00$. Within the range of the relational expression, it is beneficial to further increase the field of view and improve the image quality at the last lens by reasonably controlling the relationship between the radial height of the intersection between chief ray of 0.6 field of view and the image-side surface of the seventh lens and the on-axis thickness the seventh lens, the focal length and the overall focal length. As an improvement, $-5.30 \leq (H0.6r14/d13) * (f7/f) \leq -3.70$.

The focal length of the sixth lens is defined as f6, and the focal length of the seventh lens is defined as f7. $-1.80 \leq f6/f7 \leq -0.90$. Within the range of the relational expression, the refractive powers of the sixth lens and the seventh lens may be adjusted to help compress the volume and correct the aberration. As an improvement, $-1.55 \leq f6/f73-1.10$.

A central curvature radius of the object-side surface of the first lens is defined as R1 in the paraxial region, a central curvature radius of the image-side surface of the first lens is defined as R2 in the paraxial region, and the following relational expression is satisfied: $0.21 \leq R1/R2 \leq 0.42$. Within the range of the relational expression, the shape of the surface of the first lens may be adjusted by controlling the ratio of the curvature radius of the object-side surface of the first lens to the curvature radius of the image-side surface of the first lens, which helps adjust the direction of light travel to form a wide-angle configuration. As an improvement, $0.25 \leq R1/R2 \leq 0.35$.

An on-axis distance from the image-side surface of the second lens to the object-side surface of the third lens is defined as d4, an on-axis thickness of the third lens is defined as d5, an on-axis distance from the image-side surface of the third lens to the object-side surface of the fourth lens is defined as d6, and the following relational expression is satisfied: $0.30 \leq d5/(d4+d6) \leq 0.55$. It is beneficial to adjust the optical path of the light at the third lens, and increase the field angle without affecting the image quality by controlling the ratio of the on-axis thickness of the third lens to the sum of its front and rear air gap. As an improvement, $0.35 \leq d5/(d4+d6) \leq 0.45$.

A central curvature radius of the object-side surface of the third lens is defined as R5 in the paraxial region, a central curvature radius of the image-side surface of the third lens is defined as R6 in the paraxial region, and the following relational expression is satisfied: $-3.45 \leq R5/R63-0.20$. Within the range of the relational expression, the shape of the surface and the refractive power of the third lens may be adjusted to help correct the aberration and compress the volume. As an improvement, $-2.85 \leq R5/R6 \leq -0.20$.

The focal length of the camera optical lens is defined as f, the focal length of the fifth lens is defined as f5, and the following relational expression is satisfied: $-11.60 \leq f5/f \leq -3.00$. Within the range of the relational expression, the refractive power is effectively and reasonably allocated, so as to meet the design requirements of the wide-angle system. As an improvement, $-10.00 \leq f5/f \leq -3.50$.

The focal length of the camera optical lens is defined as f, the focal length of the first lens is defined as f1, and the following relational expression is satisfied: $1.00 \leq f1/f \leq 1.40$. Within the range of the relational expression, the refractive power is effectively and reasonably allocated, so as to meet the design requirements of the wide-angle system. As an improvement, $1.05 \leq f1/f \leq 1.25$.

The on-axis thickness of the first lens is defined as d1, a total optical length from the object-side surface of the first lens to an image plane of the camera optical lens along an optic axis of the camera optical lens is defined as TTL, and the following relational expression is satisfied: $0.09 \leq d1/TTL \leq 0.16$. Within range of the relational expression, it is beneficial to achieve ultra-thin. As an improvement, $0.10 \leq d1/TTL \leq 0.14$.

Compared with the prior art, the camera optical lens provided by the present disclosure has good imaging quality and effectively reduces the sensitivity of the camera optical lens by configuring $5.00 \leq (f4-f5)/f1 \leq 12.00$; $2.10 \leq (R3+R4)/f \leq 3.50$; $20.00 \leq (R9+R4)/d9 \leq 40.00$; $-9.00 \leq (f2-f3)/f \leq -3.00$; $0.20 \leq H0.6r9/IH \leq 0.30$; $16.00 \leq f1/H0.6r1 * \tan(\text{semi-FOV})$ ≤30.00; −6.00≤(H0.6r14/d13)*(f7/f)≤−3.00. The camera optical lens has good imaging quality and effectively reduces the sensitivity of the camera optical lens; furthermore, it is beneficial to balance the coma differences generated by the front lens of the optical imaging system, so that the system has good imaging quality; it is beneficial to achieve wide-angle; it is beneficial to reduce the decenter and thickness sensitivity of the lens and improve the processability of the lens; there is a reasonable turning angle from the fourth lens to the fifth lens, which is beneficial to the wide-angle of the camera optical lens; the object-side surface of the first lens has an reasonable curvature, which is beneficial to achieve wide-angle; it is beneficial to further increase the field of view and improve the image quality at the last lens.

In addition, compared with the prior art, in the present disclosure, by configuring 0.20≤H0.6r9/IH≤0.30; 16.00≤f1/H0.6r1*tan(semi FOV)≤30.00; −6.00≤(H0.6r14/d13)*(f7/f)≤−3.00; 0.21≤R1/R2≤0.42; 0.30≤d5/(d4+d6)≤0.55; −3.45≤R5/d6≤−0.20; −11.60≤f5/f≤−3.00, the light has a reasonable turning angle from the fourth lens to the fifth lens, which is beneficial to the camera optical lens to achieve wide-angle; the object-side surface of the first lens has a reasonable curvature, which is beneficial to achieve wide-angle; it is beneficial to further increase the field of view and improve the image quality at the last lens; the traveling direction of the light is reasonably adjusted to form a wide-angle configuration; it is beneficial to adjust the optical path of the light at the third lens without affecting the image quality; it is beneficial to correct the aberration and compress the volume; the refractive power is effectively and reasonably allocated, which meets the design requirements of the wide-angle system.

The camera optical lens of the present disclosure will be described below with examples. The reference signs recited in each example are shown below. The units of the focal length, the on-axis distance, the central curvature radius and the on-axis thickness are mm.

TTL: total optical length from the object-side surface of the first lens to an image plane of the camera optical lens along an optic axis (the on-axis distance from the object-side surface of the first lens L1 to the image plane Si), in mm.

F-number FNO: refers to the ratio of the effective focal length of the camera optical lens to the entrance pupil diameter of the camera optical lens.

The technical solutions of the present disclosure will be described in detail in four embodiments.

Embodiment 1

Table 1 and Table 2 show design data of the camera optical lens 10 according to Embodiment 1 of the present disclosure.

TABLE 1

| | R | d | | nd | | vd | |
|---|---|---|---|---|---|---|---|
| S1 | ∞ | d0= | −0.090 | | | | |
| R1 | 3.537 | d1= | 1.340 | nd1 | 1.4959 | v1 | 81.65 |
| R2 | 10.359 | d2= | 0.330 | | | | |
| R3 | 13.001 | d3= | 0.335 | nd2 | 1.6700 | v2 | 19.39 |
| R4 | 10.572 | d4= | 0.747 | | | | |
| R5 | −97.461 | d5= | 0.338 | nd3 | 1.6700 | v3 | 19.39 |
| R6 | 35.078 | d6= | 0.034 | | | | |
| R7 | 28.871 | d7= | 0.744 | nd4 | 1.5444 | v4 | 55.82 |
| R8 | −72.109 | d8= | 0.868 | | | | |
| R9 | 10.111 | d9= | 0.579 | nd5 | 1.5661 | v5 | 37.71 |

TABLE 1-continued

| | R | d | | nd | | vd | |
|---|---|---|---|---|---|---|---|
| R10 | 7.105 | d10= | 0.330 | | | | |
| R11 | 4.436 | d11= | 0.650 | nd6 | 1.5444 | v6 | 55.82 |
| R12 | −35.069 | d12= | 1.140 | | | | |
| R13 | 8.094 | d13= | 0.588 | nd7 | 1.5346 | v7 | 55.69 |
| R14 | 2.431 | d14= | 0.350 | | | | |
| R15 | ∞ | d15= | 0.310 | ndg | 1.5168 | vg | 64.17 |
| R16 | ∞ | d16= | 1.467 | | | | |

The meaning of each reference sign is as follows.

S1: aperture;

R: curvature radius at the center of the optical surface;

R1: central curvature radius of the object-side surface of the first lens L1 in the paraxial region;

R2: central curvature radius of the image-side surface of the first lens L1 in the paraxial region;

R3: central curvature radius of the object-side surface of the second lens L2 in the paraxial region;

R4: central curvature radius of the image-side surface of the second lens L2 in the paraxial region;

R5: central curvature radius of the object-side surface of the third lens L3 in the paraxial region;

R6: central curvature radius of the image-side surface of the third lens L3 in the paraxial region;

R7: central curvature radius of the object-side surface of the fourth lens L4 in the paraxial region;

R8: central curvature radius of the image-side surface of the fourth lens L4 in the paraxial region;

R9: central curvature radius of the object-side surface of the fifth lens L5 in the paraxial region;

R10: central curvature radius of the image-side surface of the fifth lens L5 in the paraxial region;

R11: central curvature radius of the object-side surface of the sixth lens L6 in the paraxial region;

R12: central curvature radius of the image-side surface of the sixth lens L6 in the paraxial region;

R13: central curvature radius of the object-side surface of the seventh lens L7 in the paraxial region;

R14: central curvature radius of the image-side surface of the seventh lens L7 in the paraxial region;

R15: central curvature radius of the object-side surface of the grating filter GF in the paraxial region;

R16: central curvature radius of the image-side surface of the grating filter GF in the paraxial region;

d: on-axis thickness of lenses, on-axis distance between lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the seventh lens L7;

d13: on-axis thickness of the seventh lens L7;

d14: on-axis distance from the image-side surface of the seventh lens L7 to the object-side surface of the grating filter GF;

d15: on-axis thickness of the grating filter GF;

d16: on-axis distance from the image-side surface of the grating filter GF to the image plane Si;

nd: refractive index of d line (the d line is green light with a wavelength of 550 nm);

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

nd6: refractive index of d line of the sixth lens L6;

nd7: refractive index of d line of the seventh lens L7;

ndg: refractive index of d line of the grating filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

vg: abbe number of the grating filter GF.

Table 2 shows aspheric surface data of each lens in the camera optical lens 10 according to Embodiment 1 of the present disclosure.

TABLE 2

| | Conic Coefficient | Aspheric Coefficient | | | | |
|---|---|---|---|---|---|---|
| | k | A4 | A6 | A8 | A10 | A12 |
| R1 | 0.0000E+00 | −1.1993E−03 | 3.6725E−03 | −4.5845E−03 | 3.0115E−03 | −1.1706E−03 |
| R2 | 0.0000E+00 | −2.0868E−03 | −2.4311E−03 | 3.6306E−03 | −2.9621E−03 | 1.4108E−03 |
| R3 | 0.0000E+00 | −6.1236E−03 | 1.9643E−03 | −1.8345E−03 | 1.6957E−03 | −8.3480E−04 |
| R4 | 0.0000E+00 | −4.3231E−03 | 2.8029E−03 | −3.7708E−03 | 3.8939E−03 | −2.2972E−03 |
| R5 | 0.0000E+00 | −5.8549E−03 | −4.7582E−03 | 2.0554E−03 | −1.4567E−03 | 7.0221E−04 |
| R6 | 0.0000E+00 | 4.4896E−03 | −1.3329E−02 | 6.5635E−03 | −2.4498E−03 | 6.8019E−04 |
| R7 | 0.0000E+00 | 1.4950E−03 | −8.5217E−03 | 2.5820E−03 | 4.0780E−04 | −4.5790E−04 |
| R8 | 0.0000E+00 | −1.1350E−02 | 1.9601E−03 | −1.7533E−03 | 9.0312E−04 | −2.7225E−04 |
| R9 | −1.0000E+00 | −1.6912E−02 | 1.3176E−03 | 3.0338E−03 | −2.2594E−03 | 7.3333E−04 |
| R10 | −1.0000E+00 | −1.9480E−02 | −1.6143E−02 | 1.5110E−02 | −7.3072E−03 | 2.4200E−03 |
| R11 | −1.0000E+00 | 3.0823E−02 | −2.2883E−02 | 9.6637E−03 | −3.3610E−03 | 8.6953E−04 |
| R12 | −1.0000E+00 | 4.6043E−02 | −7.0266E−03 | −2.1885E−03 | 1.1686E−03 | −2.6470E−04 |
| R13 | −1.0000E+00 | −4.8935E−02 | 7.7143E−03 | −1.1390E−03 | 1.4717E−04 | −1.2012E−05 |
| R14 | −1.0000E+00 | −6.4016E−02 | 1.4619E−02 | −2.9548E−03 | 4.6757E−04 | −5.5095E−05 |

| | Conic Coefficient | Aspheric Coefficient | | | | |
|---|---|---|---|---|---|---|
| | k | A14 | A16 | A18 | A20 | A22 |
| R1 | 0.0000E+00 | 2.7749E−04 | −3.9471E−05 | 3.0977E−06 | −1.0333E−07 | 0.0000E+00 |
| R2 | 0.0000E+00 | −4.0403E−04 | 6.8901E−05 | −6.4539E−06 | 2.5490E−07 | 0.0000E+00 |
| R3 | 0.0000E+00 | 2.5054E−04 | −4.4797E−05 | 4.4023E−06 | −1.8401E−07 | 0.0000E+00 |
| R4 | 0.0000E+00 | 8.3103E−04 | −1.8011E−04 | 2.1485E−05 | −1.0804E−06 | 0.0000E+00 |
| R5 | 0.0000E+00 | −2.1546E−04 | 3.9844E−05 | −3.8801E−06 | 1.4951E−07 | 0.0000E+00 |
| R6 | 0.0000E+00 | −1.2829E−04 | 1.4097E−05 | −6.4366E−07 | −1.8258E−09 | 0.0000E+00 |
| R7 | 0.0000E+00 | 1.3575E−04 | −2.1442E−05 | 1.8368E−06 | −6.6552E−08 | 0.0000E+00 |
| R8 | 0.0000E+00 | 5.1653E−05 | −5.9516E−06 | 3.5822E−07 | −7.6005E−09 | 0.0000E+00 |
| R9 | −1.0000E+00 | −7.9485E−05 | −3.0151E−05 | 1.5568E−05 | −3.5220E−06 | 4.8629E−07 |
| R10 | −1.0000E+00 | −5.8265E−04 | 1.0333E−04 | −1.3514E−05 | 1.2972E−06 | −9.0101E−08 |
| R11 | −1.0000E+00 | −1.6116E−04 | 2.1309E−05 | −2.0235E−06 | 1.3871E−07 | −6.8321E−09 |
| R12 | −1.0000E+00 | 3.7888E−05 | −3.7841E−06 | 2.7507E−07 | −1.4789E−08 | 5.8548E−10 |
| R13 | −1.0000E+00 | 4.6461E−07 | 7.5632E−09 | −1.9160E−09 | 1.1039E−10 | −3.6033E−12 |
| R14 | −1.0000E+00 | 4.7645E−06 | −3.0153E−07 | 1.3944E−08 | −4.6848E−10 | 1.1276E−11 |

| | Conic Coefficient | Aspheric Coefficient | | | | |
|---|---|---|---|---|---|---|
| | k | A24 | A26 | A28 | A30 | / |
| R1 | 0.0000E+00 | 0.0000E+00 | 0.0000E+00 | 0.0000E+00 | 0.0000E+00 | / |
| R2 | 0.0000E+00 | 0.0000E+00 | 0.0000E+00 | 0.0000E+00 | 0.0000E+00 | / |
| R3 | 0.0000E+00 | 0.0000E+00 | 0.0000E+00 | 0.0000E+00 | 0.0000E+00 | / |
| R4 | 0.0000E+00 | 0.0000E+00 | 0.0000E+00 | 0.0000E+00 | 0.0000E+00 | / |
| R5 | 0.0000E+00 | 0.0000E+00 | 0.0000E+00 | 0.0000E+00 | 0.0000E+00 | / |
| R6 | 0.0000E+00 | 0.0000E+00 | 0.0000E+00 | 0.0000E+00 | 0.0000E+00 | / |
| R7 | 0.0000E+00 | 0.0000E+00 | 0.0000E+00 | 0.0000E+00 | 0.0000E+00 | / |
| R8 | 0.0000E+00 | 0.0000E+00 | 0.0000E+00 | 0.0000E+00 | 0.0000E+00 | / |
| R9 | −1.0000E+00 | −4.3206E−08 | 2.4160E−09 | −7.7446E−11 | 1.0846E−12 | / |
| R10 | −1.0000E+00 | 4.4007E−09 | −1.4314E−10 | 2.7806E−12 | −2.4377E−14 | / |
| R11 | −1.0000E+00 | 2.3679E−10 | −5.5000E−12 | 7.7044E−14 | −4.9281E−16 | / |
| R12 | −1.0000E+00 | −1.6627E−11 | 3.2028E−13 | −3.7386E−15 | 1.9902E−17 | / |

TABLE 2-continued

| | | | | | | |
|---|---|---|---|---|---|---|
| R13 | −1.0000E+00 | 7.3591E−14 | −9.2830E−16 | 6.5708E−18 | −1.9643E−20 | / |
| R14 | −1.0000E+00 | −1.8904E−13 | 2.0927E−15 | −1.3728E−17 | 4.0358E−20 | / |

For convenience, the aspheric surface of each lens surface uses the aspheric surface shown in the following formula (1). However, the present disclosure is not limited to the aspheric polynomial form shown in formula (1).

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20}+A22r^{22}+A24r^{24}+A26r^{26}+A28r^{28}+A30r^{30} \quad (1)$$

k is a conic coefficient, A4, A6, A8, A10, A12, A14, A16, A18, A20, A22, A24, A26, A28 and A30 are aspheric coefficients, c is a curvature at a center of an optical surface, r is a vertical distance between a point on an aspheric curve and an optical axis, and z is an aspheric depth (a vertical distance between a point on the aspheric surface and the optical axis, where r is a distance from the point on the aspheric surface to the optical axis, and a vertical distance between the point on the aspheric surface and a tangent plane tangent to a vertex on the aspheric optical axis).

Figure 2:
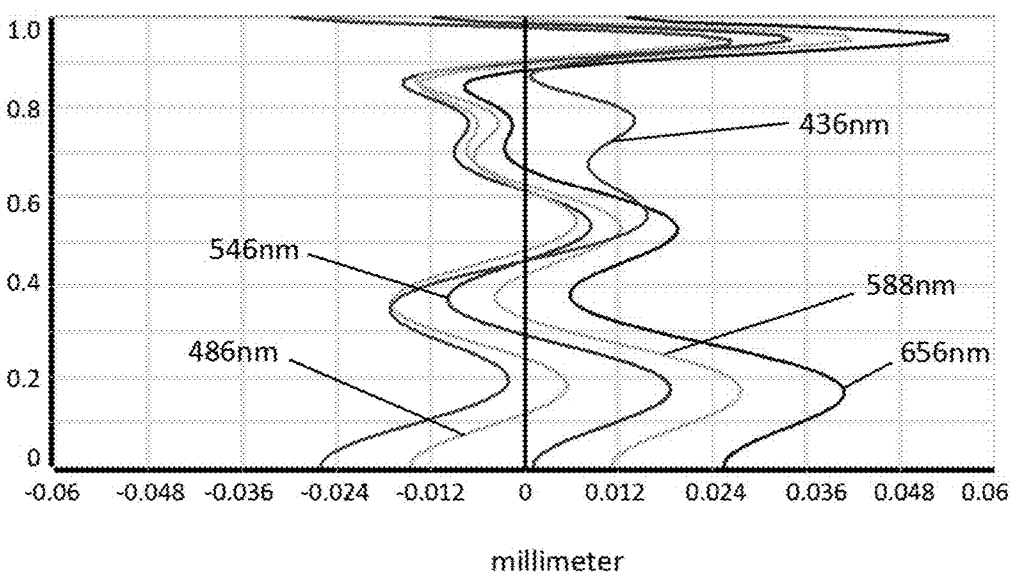
FIG. 2 is a schematic diagram of longitudinal aberration of the camera optical lens shown in FIG. 1.
Figure 3:
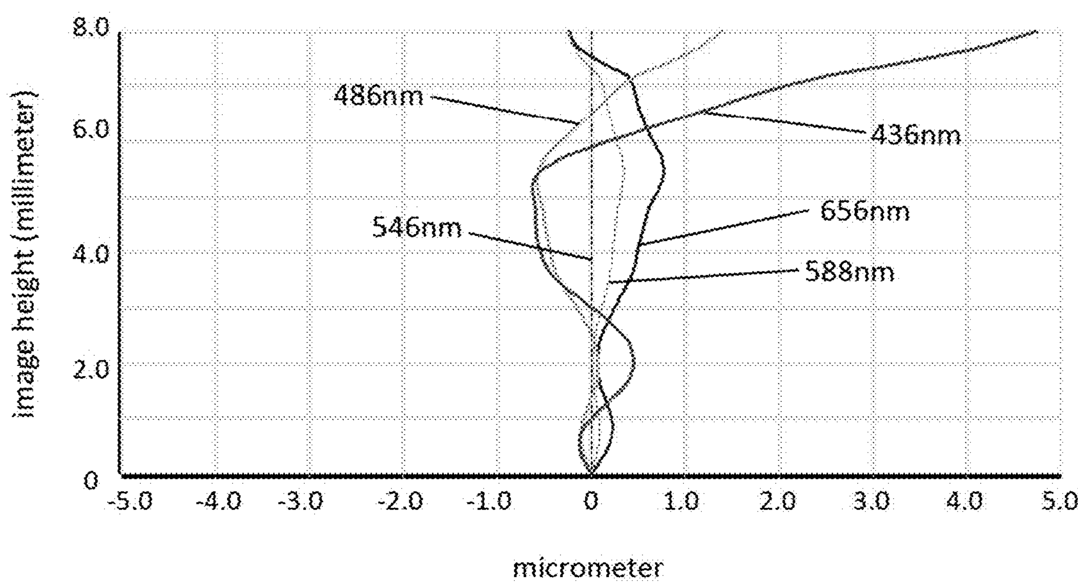
FIG. 3 is a schematic diagram of lateral color of the camera optical lens shown in FIG. 1.
Figure 4:
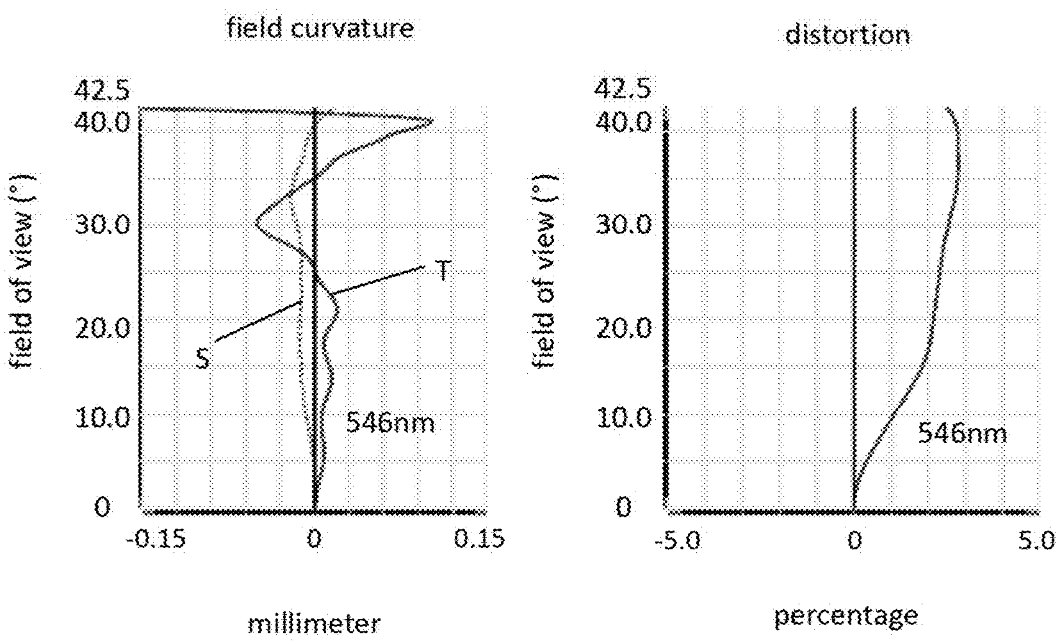
FIG. 4 is a schematic diagram of field curvature and distortion of the camera optical lens shown in FIG. 1.

FIG. 2 and FIG. 3 respectively show longitudinal aberration and lateral color of light with wavelengths of 656 nm, 588 nm, 546 nm, 486 nm and 436 nm after passing through the camera optical lens 10 according to Embodiment 1. FIG. 4 shows field curvature and distortion of light with wavelength 546 nm after passing through the camera optical lens 10 as described in the Embodiment 1, the field curvature S in FIG. 4 is the field curvature in the sagittal direction, and T is the field curvature in the meridional direction.

In the embodiment, the entrance pupil diameter ENPD of the camera optical lens 10 is 4.868 mm, the full field of view (1.0 field of view) image height IH is 8.000 mm, the FOV of the full field of view (1.0 field of view) in the diagonal direction is 84.97°, MIC field of view image height (IH) is 8.290 mm, and field of view FOV of MIC field of view in the diagonal is 87.18°. The camera optical lens 10 meets design requirements of wide-angle, low sensitivity, good processability, miniaturization, sufficient correction of aberration, and has excellent imaging performance.

It may be understood that the 1.0 field of view image height refers to half of the diagonal length of an effective pixel area of the sensor; the MIC field of view image height refers to a field of view height that is expanded from the 1.0 field of view image height and is used to prevent assembly deviation; the FOV in the diagonal direction of the 1.0 field of view refers to the field of view corresponding to the effective pixel area of the sensor; and the FOV in the diagonal direction of the MIC field of view refers to a field of view corresponding to the MIC field of view image height.

Embodiment 2

The meaning of the reference signs of Embodiment 2 is the same as that of Embodiment 1.

Figure 5:
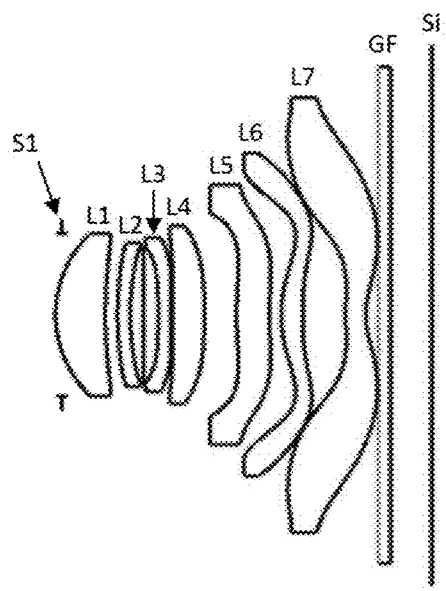
FIG. 5 is a structural schematic diagram of a camera optical lens according to Embodiment 2 of the present disclosure.

FIG. 5 shows a camera optical lens 20 according to Embodiment 2 of the present disclosure.

Table 3 and Table 4 show design data of the camera optical lens 20 according to Embodiment 2 of the present disclosure.

TABLE 3

| | R | | d | | nd | | νd |
|---|---|---|---|---|---|---|---|
| S1 | ∞ | d0= | −0.165 | | | | |
| R1 | 3.543 | d1= | 1.340 | nd1 | 1.4959 | ν1 | 81.65 |
| R2 | 13.188 | d2= | 0.330 | | | | |
| R3 | 9.942 | d3= | 0.340 | nd2 | 1.6700 | ν2 | 19.39 |
| R4 | 7.901 | d4= | 0.752 | | | | |
| R5 | −30.187 | d5= | 0.346 | nd3 | 1.6700 | ν3 | 19.39 |
| R6 | 121.348 | d6= | 0.034 | | | | |
| R7 | 42.527 | d7= | 0.863 | nd4 | 1.5444 | ν4 | 55.82 |
| R8 | −29.173 | d8= | 0.868 | | | | |
| R9 | 10.238 | d9= | 0.894 | nd5 | 1.5661 | ν5 | 37.71 |
| R10 | 8.092 | d10= | 0.330 | | | | |
| R11 | 5.184 | d11= | 0.590 | nd6 | 1.5444 | ν6 | 55.82 |
| R12 | −43.902 | d12= | 1.140 | | | | |
| R13 | 9.696 | d13= | 0.538 | nd7 | 1.5346 | ν7 | 55.69 |
| R14 | 2.386 | d14= | 0.350 | | | | |
| R15 | ∞ | d15= | 0.310 | ndg | 1.5168 | νg | 64.17 |
| R16 | ∞ | d16= | 1.110 | | | | |

Table 4 shows aspheric surface data of each lens in the camera optical lens 20 according to Embodiment 2 of the present disclosure.

TABLE 4

| | Conic Coefficient | Aspheric Coefficient | | | | |
|---|---|---|---|---|---|---|
| | k | A4 | A6 | A8 | A10 | A12 |
| R1 | 2.5879E−02 | −1.9539E−04 | 1.8338E−05 | 5.2471E−05 | −6.8479E−05 | 3.3595E−05 |
| R2 | 4.8509E+00 | −2.7496E−03 | −2.4646E−04 | 6.4815E−04 | −5.4641E−04 | 2.8080E−04 |
| R3 | −2.2797E+00 | −5.7211E−03 | 1.3238E−03 | −6.2009E−04 | 7.3505E−04 | −4.4277E−04 |
| R4 | −1.6673E+00 | −3.7336E−03 | 1.3090E−03 | −9.7701E−04 | 1.0967E−03 | −6.7899E−04 |
| R5 | −3.0156E+01 | −4.7888E−03 | −8.4160E−03 | 4.7556E−03 | −2.3980E−03 | 8.0286E−04 |
| R6 | 2.3872E+03 | 4.2421E−03 | −1.5781E−02 | 7.6131E−03 | −2.1439E−03 | 2.6920E−04 |
| R7 | 1.3170E+02 | 6.5091E−04 | −8.6751E−03 | 3.8316E−03 | −3.5928E−04 | −2.6159E−04 |
| R8 | −3.4673E+00 | −1.4698E−02 | 2.5493E−03 | −3.1750E−04 | −2.7395E−04 | 1.9297E−04 |
| R9 | −7.4130E+00 | −1.6247E−02 | 1.6980E−03 | 7.6232E−04 | −4.7508E−04 | 1.2479E−05 |
| R10 | −1.0563E+00 | −1.3472E−02 | −1.4641E−02 | 1.0874E−02 | −4.2134E−03 | 1.0893E−03 |
| R11 | −1.0615E+00 | 3.2744E−02 | −2.3863E−02 | 8.5663E−03 | −2.3926E−03 | 5.5313E−04 |
| R12 | 7.1927E+01 | 4.7875E-02 | −1.1731E−02 | −9.8577E−04 | 1.3713E−03 | −4.3698E−04 |
| R13 | −1.4707E−01 | −4.6858E−02 | 5.7748E−03 | −2.0756E−04 | −9.2589E−05 | 2.5412E−05 |

TABLE 4-continued

| | | | | | | |
|---|---|---|---|---|---|---|
| R14 | −9.9967E−01 | −6.3258E−02 | 1.4058E−02 | −2.6639E−03 | 3.9681E−04 | −4.4847E−05 |

| | Conic Coefficient | Aspheric Coefficient | | | | |
|---|---|---|---|---|---|---|
| | k | A14 | A16 | A18 | A20 | A22 |
| R1 | 2.5879E−02 | −8.7141E−06 | 1.1536E−06 | −6.2063E−08 | 0.0000E+00 | 0.0000E+00 |
| R2 | 4.8509E+00 | −8.9568E−05 | 1.7205E−05 | −1.8016E−06 | 7.7589E−08 | 0.0000E+00 |
| R3 | −2.2797E+00 | 1.6009E−04 | −3.4323E−05 | 4.0997E−06 | −2.1142E−07 | 0.0000E+00 |
| R4 | −1.6673E+00 | 2.5507E−04 | −5.7021E−05 | 7.0208E−06 | −3.5903E−07 | 0.0000E+00 |
| R5 | −3.0156E+01 | −1.7001E−04 | 2.0601E−05 | −1.0242E−06 | 0.0000E+00 | 0.0000E+00 |
| R6 | 2.3872E+03 | 2.7091E−05 | −1.5699E−05 | 2.3507E−06 | −1.2855E−07 | 0.0000E+00 |
| R7 | 1.3170E+02 | 1.1390E−04 | −2.1284E−05 | 2.0125E−06 | −7.7540E−08 | 0.0000E+00 |
| R8 | −3.4673E+00 | −5.7567E−05 | 9.3496E−06 | −8.1978E−07 | 3.0787E−08 | 0.0000E+00 |
| R9 | −7.4130E+00 | 7.0076E−05 | −3.2966E−05 | 8.0416E−06 | −1.1825E−06 | 1.0001E−07 |
| R10 | −1.0563E+00 | −2.0199E−04 | 2.7412E−05 | −2.7066E−06 | 1.8999E−07 | −9.0697E−09 |
| R11 | −1.0615E+00 | −1.0483E−04 | 1.5556E−05 | −1.7470E−06 | 1.4537E−07 | −8.7751E−09 |
| R12 | 7.1927E+01 | 8.2596E−05 | −1.0624E−05 | 9.7373E−07 | −6.4426E−08 | 3.0566E−09 |
| R13 | −1.4707E−01 | −3.3827E−06 | 2.8135E−07 | −1.5786E−08 | 6.1635E−10 | −1.6850E−11 |
| R14 | −9.9967E−01 | 3.7886E−06 | −2.3750E−07 | 1.0984E−08 | −3.7155E−10 | 9.0477E−12 |

| | Conic Coefficient | Aspheric Coefficient | | | | |
|---|---|---|---|---|---|---|
| | k | A24 | A26 | A28 | A30 | / |
| R1 | 2.5879E−02 | 0.0000E+00 | 0.0000E+00 | 0.0000E+00 | 0.0000E+00 | / |
| R2 | 4.8509E+00 | 0.0000E+00 | 0.0000E+00 | 0.0000E+00 | 0.0000E+00 | / |
| R3 | −2.2797E+00 | 0.0000E+00 | 0.0000E+00 | 0.0000E+00 | 0.0000E+00 | / |
| R4 | −1.6673E+00 | 0.0000E+00 | 0.0000E+00 | 0.0000E+00 | 0.0000E+00 | / |
| R5 | −3.0156E+01 | 0.0000E+00 | 0.0000E+00 | 0.0000E+00 | 0.0000E+00 | / |
| R6 | 2.3872E+03 | 0.0000E+00 | 0.0000E+00 | 0.0000E+00 | 0.0000E+00 | / |
| R7 | 1.3170E+02 | 0.0000E+00 | 0.0000E+00 | 0.0000E+00 | 0.0000E+00 | / |
| R8 | −3.4673E+00 | 0.0000E+00 | 0.0000E+00 | 0.0000E+00 | 0.0000E+00 | / |
| R9 | −7.4130E+00 | −3.2029E−09 | −2.0015E−10 | 2.2160E−11 | −6.0727E−13 | / |
| R10 | −1.0563E+00 | 2.6916E−10 | −3.8762E−12 | −5.9501E−15 | 6.5662E−16 | / |
| R11 | −1.0615E+00 | 3.7219E−10 | −1.0489E−11 | 1.7604E−13 | −1.3295E−15 | / |
| R12 | 7.1927E+01 | −1.0138E−10 | 2.2311E−12 | −2.9257E−14 | 1.7300E−16 | / |
| R13 | −1.4707E−01 | 3.1736E−13 | −3.9323E−15 | 2.8909E−17 | −9.5679E−20 | / |
| R14 | −9.9967E−01 | −1.5405E−13 | 1.7378E−15 | −1.1656E−17 | 3.5160E−20 | / |

Figure 6:
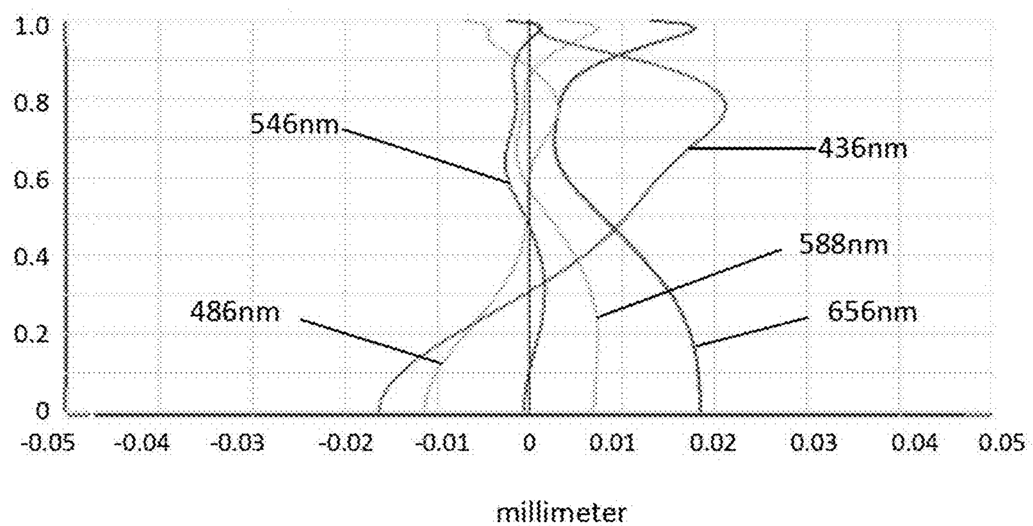
FIG. 6 is a schematic diagram of longitudinal aberration of the camera optical lens shown in FIG. 5.
Figure 7:
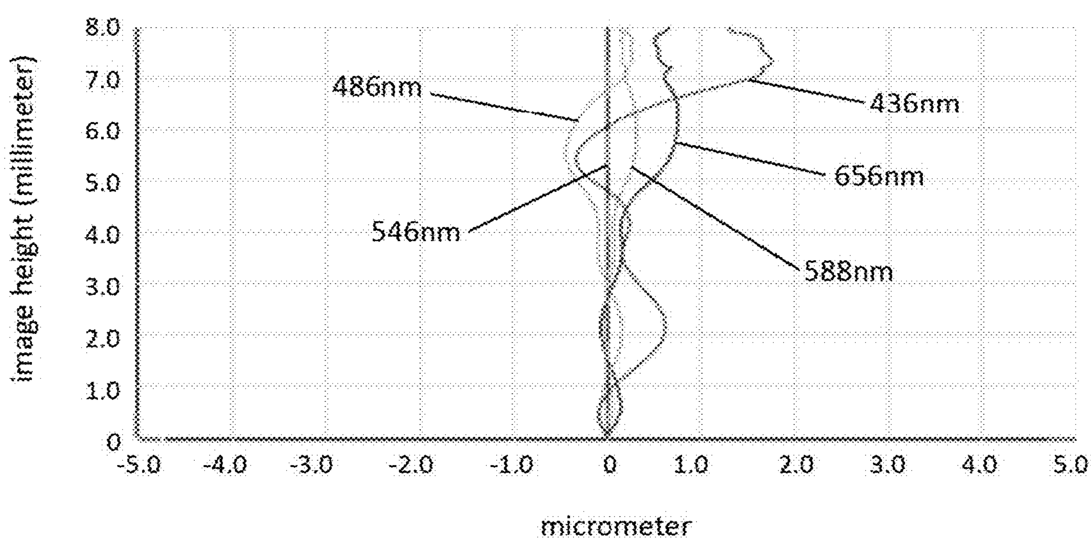
FIG. 7 is a schematic diagram of lateral color of the camera optical lens shown in FIG. 5.
Figure 8:
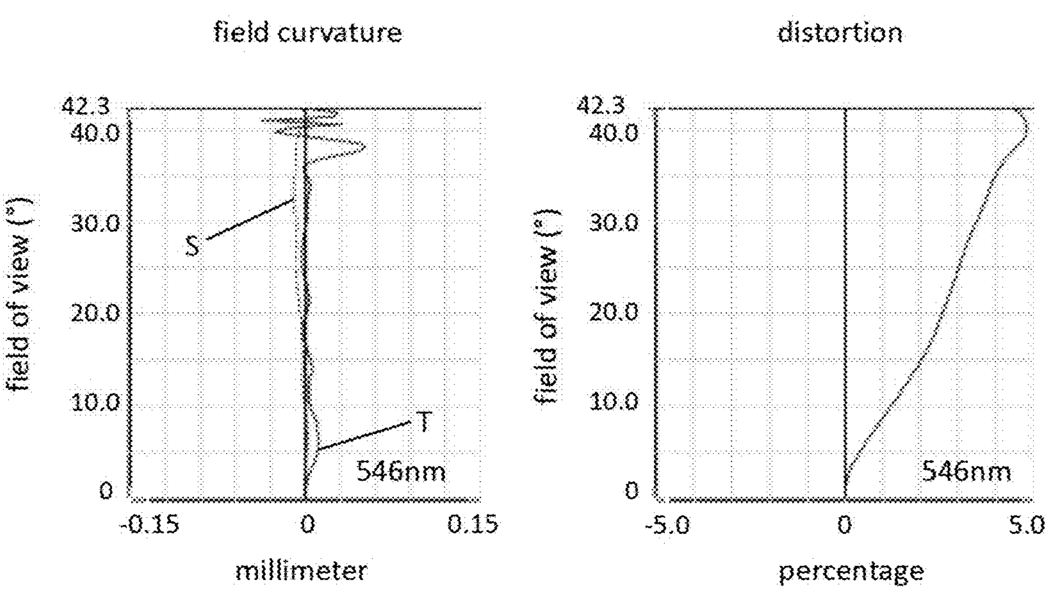
FIG. 8 is a schematic diagram of field curvature and distortion of the camera optical lens shown in FIG. 5.

FIG. 6 and FIG. 7 respectively show longitudinal aberration and lateral color of light with wavelengths of 656 nm, 588 nm, 546 nm, 486 nm and 436 nm after passing through the camera optical lens 20 according to Embodiment 2. FIG. 8 shows field curvature and distortion of light with a wavelength of 546 nm after passing through the camera optical lens 20 according to Embodiment 2. The field curvature S in FIG. 8 is the field curvature in the sagittal direction, and T is the field curvature in the meridian direction.

In this embodiment, the entrance pupil diameter ENPD of the camera optical lens 20 is 4.811 mm, the full field of view (1.0 field of view) image height IH is 8.000 mm, the field of view FOV the full field of view (1.0 field of view) in a diagonal direction is 84.55°, the MIC field of view image height is 8.150 mm, field of view FOV of MIC field of view in the diagonal direction is 85.83°, the camera optical lens 20 meets the design requirements of wide-angle, low sensitivity, good processability, miniaturization sufficient correction of aberration, and excellent imaging performance.

Embodiment 3

The meaning of the reference signs of Embodiment 3 is the same as that of Embodiment 1.

Figure 9:
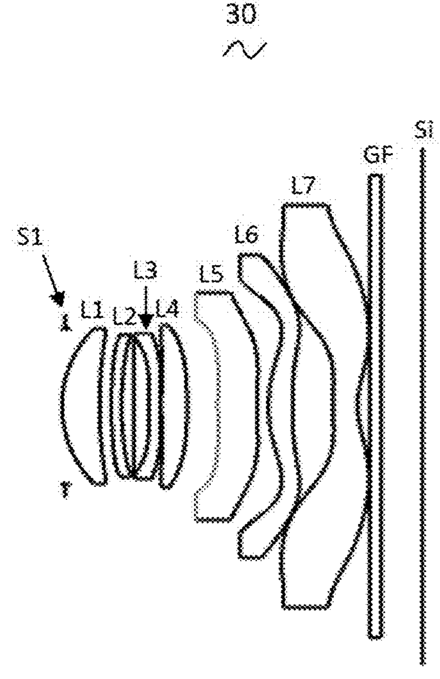
FIG. 9 is a structural schematic diagram of a camera optical lens according to Embodiment 3 of the present disclosure.

FIG. 9 shows a camera optical lens 30 according to Embodiment 3 of the present disclosure.

Table 5 and Table 6 show design data of the camera optical lens 30 according to the Embodiment 3 of the present disclosure.

TABLE 5

| | R | | d | | nd | | vd |
|---|---|---|---|---|---|---|---|
| S1 | ∞ | d0= | −0.101 | | | | |
| R1 | 3.614 | d1= | 1.060 | nd1 | 1.4959 | v1 | 81.65 |
| R2 | 12.951 | d2= | 0.330 | | | | |
| R3 | 12.055 | d3= | 0.293 | nd2 | 1.6700 | v2 | 19.39 |
| R4 | 9.984 | d4= | 0.780 | | | | |
| R5 | −31.333 | d5= | 0.310 | nd3 | 1.6700 | v3 | 19.39 |
| R6 | 108.769 | d6= | 0.034 | | | | |
| R7 | 36.361 | d7= | 0.723 | nd4 | 1.5444 | v4 | 55.82 |
| R8 | −22.787 | d8= | 0.868 | | | | |
| R9 | 25.539 | d9= | 1.119 | nd5 | 1.5661 | v5 | 37.71 |
| R10 | 13.832 | d10= | 0.330 | | | | |
| R11 | 5.370 | d11= | 0.685 | nd6 | 1.5444 | v6 | 55.82 |
| R12 | −69.055 | d12= | 1.140 | | | | |
| R13 | 10.460 | d13= | 0.684 | nd7 | 1.5346 | v7 | 55.69 |
| R14 | 2.431 | d14= | 0.350 | | | | |
| R15 | ∞ | d15= | 0.310 | ndg | 1.5168 | vg | 64.17 |
| R16 | ∞ | d16= | 1.183 | | | | |

Table 6 shows aspheric surface data of each lens in the camera optical lens 30 according to Embodiment 3 of the present disclosure.

TABLE 6

| | Conic Coefficient | Aspheric Coefficient | | | | |
|---|---|---|---|---|---|---|
| | k | A4 | A6 | A8 | A10 | A12 |
| R1 | 3.2017E−02 | −1.3919E−04 | −1.7191E−04 | 2.7069E−04 | −2.1348E−04 | 9.2050E−05 |
| R2 | 9.5813E+00 | −2.4146E−03 | −5.7460E−04 | 1.3597E−03 | −1.2131E−03 | 6.3623E−04 |
| R3 | 2.5840E+00 | −5.8584E−03 | 1.7130E−03 | −4.3551E−04 | 2.8687E−04 | −1.0891E−04 |
| R4 | −3.4810E+00 | −4.1223E−03 | 1.2165E−03 | −1.4690E−04 | 8.5422E−05 | −3.9432E−05 |
| R5 | 2.5005E+01 | −6.2678E−03 | −7.6923E−03 | 3.4210E−03 | −1.2283E−03 | 2.9215E−04 |
| R6 | 1.7760E+03 | 1.0054E−03 | −1.0832E−02 | 2.7692E−03 | 8.8097E−04 | −9.0040E−04 |
| R7 | 2.0160E+02 | −1.9856E−03 | −3.6921E−03 | −1.0992E−05 | 1.6323E−03 | −9.5620E−04 |
| R8 | −8.5607E+00 | −1.4308E−02 | 1.2914E−03 | 9.1736E−04 | −1.0073E−03 | 4.7636E−04 |
| R9 | 3.2126E+01 | −1.4136E−02 | 4.1401E−03 | −7.6234E−03 | 9.3477E−03 | −7.0196E−03 |
| R10 | 5.6579E+00 | −1.0445E−03 | −2.2764E−02 | 1.5677E−02 | −6.6702E−03 | 1.9848E−03 |
| R11 | −9.6940E−01 | 3.5042E−02 | −3.0032E−02 | 1.4393E−02 | −5.1664E−03 | 1.3750E−03 |
| R12 | 1.7149E+02 | 3.9972E−02 | −1.5010E−02 | 4.2972E−03 | −1.1486E−03 | 2.4298E−04 |
| R13 | −4.9775E−01 | −4.7641E−02 | 4.2750E−03 | 9.8933E−04 | −4.8421E−04 | 1.0053E−04 |
| R14 | −9.8856E−01 | −6.2213E−02 | 1.3654E−02 | −2.4722E−03 | 3.4804E−04 | −3.7293E−05 |

| | Conic Coefficient | Aspheric Coefficient | | | | |
|---|---|---|---|---|---|---|
| | k | A14 | A16 | A18 | A20 | A22 |
| R1 | 3.2017E−02 | −2.2512E−05 | 2.9005E−06 | −1.5308E−07 | 0.0000E+00 | 0.0000E+00 |
| R2 | 9.5813E+00 | −2.0228E−04 | 3.8156E−05 | −3.8920E−06 | 1.6339E−07 | 0.0000E+00 |
| R3 | 2.5840E+00 | 2.4686E−05 | −3.1641E−06 | 2.9428E−07 | −1.9155E−08 | 0.0000E+00 |
| R4 | −3.4810E+00 | 1.5016E−05 | −4.2473E−06 | 7.9082E−07 | −5.8636E−08 | 0.0000E+00 |
| R5 | 2.5005E+01 | −4.6553E−05 | 5.3352E−06 | −3.1237E−07 | 0.0000E+00 | 0.0000E+00 |
| R6 | 1.7760E+03 | 3.0503E−04 | −5.4241E−05 | 5.1200E−06 | −2.0439E−07 | 0.0000E+00 |
| R7 | 2.0160E+02 | 2.6979E−04 | −4.2455E−05 | 3.5796E−06 | −1.2612E−07 | 0.0000E+00 |
| R8 | −8.5607E+00 | −1.2857E−04 | 2.0331E−05 | −1.7702E−06 | 6.6072E−08 | 0.0000E+00 |
| R9 | 3.2126E+01 | 3.4281E−03 | −1.1295E−03 | 2.5225E−04 | −3.6966E−05 | 3.1616E−06 |
| R10 | 5.6579E+00 | −4.2494E−04 | 6.5817E−05 | −7.3334E−06 | 5.7880E−07 | −3.1413E−08 |
| R11 | −9.6940E−01 | −2.7587E−04 | 4.2590E−05 | −5.1171E−06 | 4.7571E−07 | −3.3383E−08 |
| R12 | 1.7149E+02 | −3.6980E−05 | 3.9219E−06 | −2.8409E−07 | 1.3512E−08 | −3.7743E−10 |
| R13 | −4.9775E−01 | −1.2810E−05 | 1.0967E−06 | −6.5671E−08 | 2.7962E−09 | −8.4537E−11 |
| R14 | −9.8856E−01 | 3.0200E−06 | −1.8406E−07 | 8.3964E−09 | −2.8401E−10 | 7.0045E−12 |

| | Conic Coefficient | Aspheric Coefficient | | | | |
|---|---|---|---|---|---|---|
| | k | A24 | A26 | A28 | A30 | / |
| R1 | 3.2017E−02 | 0.0000E+00 | 0.0000E+00 | 0.0000E+00 | 0.0000E+00 | / |
| R2 | 9.5813E+00 | 0.0000E+00 | 0.0000E+00 | 0.0000E+00 | 0.0000E+00 | / |
| R3 | 2.5840E+00 | 0.0000E+00 | 0.0000E+00 | 0.0000E+00 | 0.0000E+00 | / |
| R4 | −3.4810E+00 | 0.0000E+00 | 0.0000E+00 | 0.0000E+00 | 0.0000E+00 | / |
| R5 | 2.5005E+01 | 0.0000E+00 | 0.0000E+00 | 0.0000E+00 | 0.0000E+00 | / |
| R6 | 1.7760E+03 | 0.0000E+00 | 0.0000E+00 | 0.0000E+00 | 0.0000E+00 | / |
| R7 | 2.0160E+02 | 0.0000E+00 | 0.0000E+00 | 0.0000E+00 | 0.0000E+00 | / |
| R8 | −8.5607E+00 | 0.0000E+00 | 0.0000E+00 | 0.0000E+00 | 0.0000E+00 | / |
| R9 | 3.2126E+01 | −8.1172E−08 | −1.1817E−08 | 1.2194E−09 | −3.6640E−11 | / |
| R10 | 5.6579E+00 | 1.1093E−09 | −2.2822E−11 | 2.0613E−13 | 0.0000E+00 | / |
| R11 | −9.6940E−01 | 1.6940E−09 | −5.8132E−11 | 1.1984E−12 | −1.1150E−14 | / |
| R12 | 1.7149E+02 | 3.5125E−12 | 1.2356E−13 | −4.2641E−15 | 4.0830E−17 | / |
| R13 | −4.9775E−01 | 1.7776E−12 | −2.4755E−14 | 2.0551E−16 | −7.7059E−19 | / |
| R14 | −9.8856E−01 | −1.2225E−13 | 1.4297E−15 | −1.0050E−17 | 3.2097E−20 | / |

Figure 10:
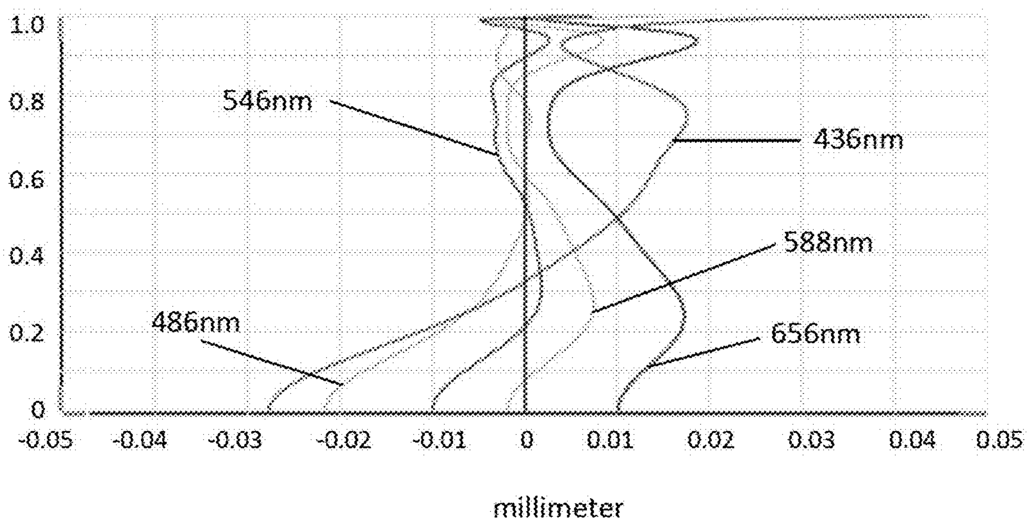
FIG. 10 is a schematic diagram of longitudinal aberration of the camera optical lens shown in FIG. 9.
Figure 11:
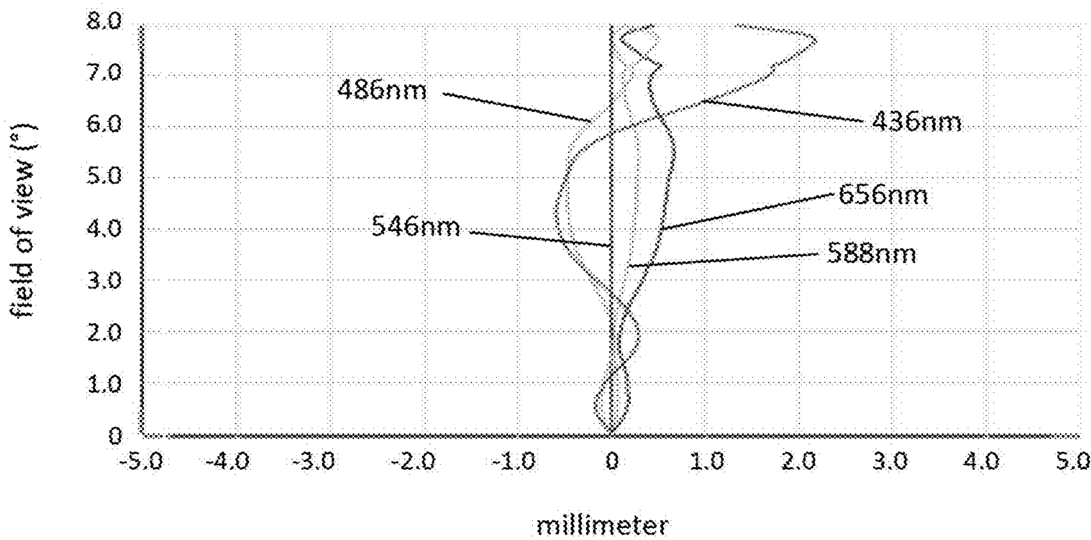
FIG. 11 is a schematic diagram of lateral color of the camera optical lens shown in FIG. 9.
Figure 12:
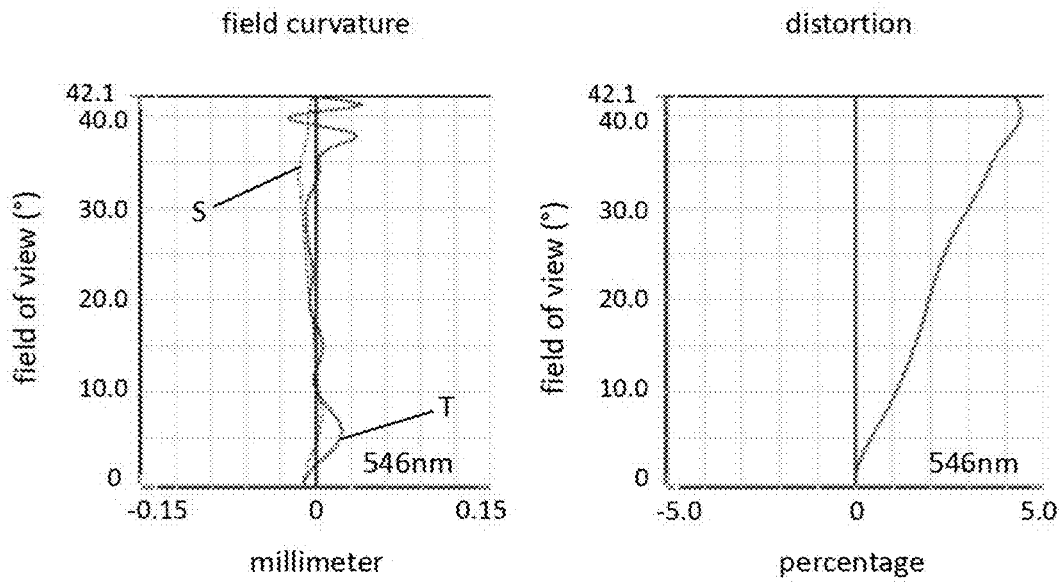
FIG. 12 is a schematic diagram of field curvature and distortion of the camera optical lens shown in FIG. 9.

FIG. 10 and FIG. 11 respectively show longitudinal aberration and lateral color of light with wavelengths of 656 nm, 588 nm, 546 nm, 486 nm and 436 nm after passing through the camera optical lens 30 according to Embodiment 3. FIG. 12 shows field curvature and distortion of light with a wavelength of 546 nm after passing through the camera optical lens 30 according to Embodiment 3. The field curvature S in FIG. 12 is the field curvature in the sagittal direction, and T is the field curvature in the meridian direction.

In this embodiment, the entrance pupil diameter ENPD of the camera optical lens 30 is 4.844 mm, the full field of view (1.0 field of view) image height IH is 8.000 mm, the field of view FOV the full field of view (1.0 field of view) in a diagonal direction is 84.23°, the MIC field of view image height is 8.150 mm, field of view FOV of MIC field of view in the diagonal direction is 85.45°, the camera optical lens 30 meets the design requirements of wide-angle, low sensitivity, good processability, miniaturization sufficient correction of aberration, and excellent imaging performance.

Embodiment 4

The meaning of the reference signs of Embodiment 4 is the same as that of Embodiment 1.

Figure 13:
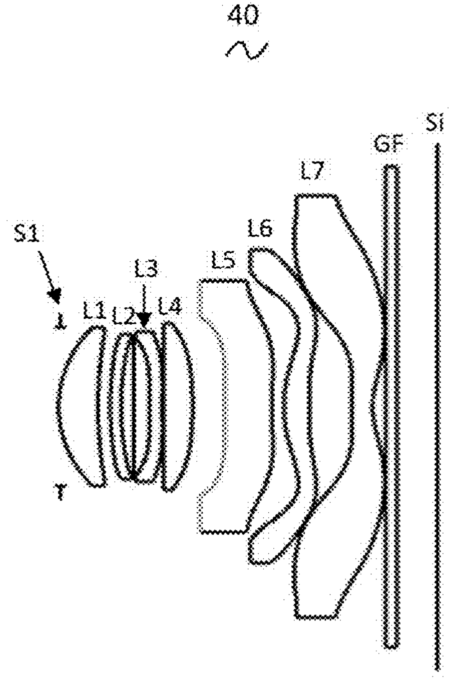
FIG. 13 is a structural schematic diagram of a camera optical lens according to Embodiment 4 of the present disclosure.

FIG. 13 shows a camera optical lens 40 according to Embodiment 4 of the present disclosure.

Table 7 and Table 8 show design data of the camera optical lens 40 according to Embodiment 4 of the present disclosure.

TABLE 7

| | R | | d | | nd | | vd |
|---|---|---|---|---|---|---|---|
| S1 | ∞ | d0= | −0.044 | | | | |
| R1 | 3.602 | d1= | 1.060 | nd1 | 1.4959 | ν1 | 81.65 |
| R2 | 12.648 | d2= | 0.330 | | | | |
| R3 | 10.027 | d3= | 0.289 | nd2 | 1.6700 | ν2 | 19.39 |
| R4 | 8.612 | d4= | 0.780 | | | | |
| R5 | −31.576 | d5= | 0.329 | nd3 | 1.6700 | ν3 | 19.39 |
| R6 | 108.253 | d6= | 0.034 | | | | |
| R7 | 36.424 | d7= | 0.780 | nd4 | 1.5444 | ν4 | 55.82 |
| R8 | −16.465 | d8= | 0.868 | | | | |
| R9 | 38.812 | d9= | 1.280 | nd5 | 1.5661 | ν5 | 37.71 |
| R10 | 12.384 | d10= | 0.330 | | | | |

TABLE 7-continued

| | R | | d | | nd | | vd |
|---|---|---|---|---|---|---|---|
| R11 | 5.221 | d11= | 0.687 | nd6 | 1.5444 | ν6 | 55.82 |
| R12 | −62.804 | d12= | 1.140 | | | | |
| R13 | 11.652 | d13= | 0.559 | nd7 | 1.5346 | ν7 | 55.69 |
| R14 | 2.500 | d14= | 0.350 | | | | |
| R15 | ∞ | d15= | 0.310 | ndg | 1.5168 | νg | 64.17 |
| R16 | ∞ | d16= | 1.075 | | | | |

Table 8 shows aspheric surface data of each lens in the camera optical lens 40 according to Embodiment 4 of the present disclosure.

TABLE 8

| | Conic Coefficient | Aspheric Coefficient | | | | |
|---|---|---|---|---|---|---|
| | k | A4 | A6 | A8 | A10 | A12 |
| R1 | 2.9751E−02 | −1.8162E−04 | 3.9821E−06 | 4.3797E−05 | −5.9021E−05 | 3.0971E−05 |
| R2 | 8.4472E+00 | −2.3625E−03 | −2.1773E−04 | 5.7878E−04 | −5.0732E−04 | 2.6861E−04 |
| R3 | 9.1118E−01 | −5.1956E−03 | 1.0766E−03 | −2.2154E−04 | 1.9645E−04 | −6.3799E−05 |
| R4 | −2.5965E+00 | −3.3346E−03 | 8.3050E−04 | −2.8702E−04 | 3.1923E−04 | −1.7272E−04 |
| R5 | −3.6261E+00 | −7.0416E−03 | −6.5878E−03 | 3.1112E−03 | −1.4226E−03 | 4.7101E−04 |
| R6 | 1.8391E+03 | −8.1902E−04 | −8.4248E−03 | 1.3547E−03 | 1.0948E−03 | −7.5904E−04 |
| R7 | 1.9898E+02 | −1.5677E−03 | −2.4286E−03 | −1.4325E−03 | 2.2264E−03 | −1.0580E−03 |
| R8 | −1.9652E+01 | −1.2642E−02 | 6.5632E−05 | 1.4317E−03 | −1.1323E−03 | 4.8364E−04 |
| R9 | 6.1046E+01 | −9.9527E−03 | −5.7881E−03 | 1.0328E−02 | −1.1999E−02 | 9.9354E−03 |
| R10 | 6.3040E+00 | −1.2247E−03 | −1.9723E−02 | 1.2594E−02 | −4.9164E−03 | 1.3390E−03 |
| R11 | −1.0373E+00 | 3.2138E−02 | −2.5690E−02 | 1.0591E−02 | −3.1261E−03 | 6.4553E−04 |
| R12 | 1.6752E+02 | 4.0683E−02 | −1.4192E−02 | 3.0987E−03 | −5.2222E−04 | 5.8994E−05 |
| R13 | −5.7838E−01 | −4.4217E−02 | 4.1429E−03 | 6.0721E−04 | −3.1939E−04 | 6.4321E−05 |
| R14 | −1.0019E+00 | −5.8363E−02 | 1.2193E−02 | −2.0624E−03 | 2.6842E−04 | −2.6408E−05 |

| | Conic Coefficient | Aspheric Coefficient | | | | |
|---|---|---|---|---|---|---|
| | k | A14 | A16 | A18 | A20 | A22 |
| R1 | 2.9751E−02 | −8.6412E−06 | 1.2208E−06 | −6.8808E−08 | 0.0000E+00 | 0.0000E+00 |
| R2 | 8.4472E+00 | −8.7011E−05 | 1.6842E−05 | −1.7652E−06 | 7.5814E−08 | 0.0000E+00 |
| R3 | 9.1118E−01 | 9.4276E−06 | 1.8130E−07 | −1.5660E−07 | 8.3110E−09 | 0.0000E+00 |
| R4 | −2.5965E+00 | 6.0565E−05 | −1.3462E−05 | 1.7896E−06 | −1.0403E−07 | 0.0000E+00 |
| R5 | −3.6261E+00 | −1.0269E−04 | 1.3437E−05 | −7.6623E−07 | 0.0000E+00 | 0.0000E+00 |
| R6 | 1.8391E+03 | 2.2707E−04 | −3.7701E−05 | 3.4344E−06 | −1.3551E−07 | 0.0000E+00 |
| R7 | 1.9898E+02 | 2.6829E−04 | −3.9298E−05 | 3.1466E−06 | −1.0670E−07 | 0.0000E+00 |
| R8 | −1.9652E+01 | −1.2350E−04 | 1.8798E−05 | −1.5888E−06 | 5.7893E−08 | 0.0000E+00 |
| R9 | 6.1046E+01 | −5.9122E−03 | 2.5338E−03 | −7.8475E−04 | 1.7544E−04 | −2.8012E−05 |
| R10 | 6.3040E+00 | −2.6386E−04 | 3.8032E−05 | −3.9966E−06 | 3.0179E−07 | −1.5909E−08 |
| R11 | −1.0373E+00 | −9.1210E−05 | 8.3283E−06 | −3.9931E−07 | −4.5362E−09 | 2.1268E−09 |
| R12 | 1.6752E+02 | −2.3201E−06 | −5.2435E−07 | 1.1562E−07 | −1.1916E−08 | 7.6030E−10 |
| R13 | −5.7838E−01 | −7.8478E−06 | 6.4019E−07 | −3.6433E−08 | 1.4722E−09 | −4.2206E−11 |
| R14 | −1.0019E+00 | 1.9513E−06 | −1.0768E−07 | 4.4014E−09 | −1.3155E−10 | 2.8150E−12 |

| | Conic Coefficient | Aspheric Coefficient | | | | |
|---|---|---|---|---|---|---|
| | k | A24 | A26 | A28 | A30 | / |
| R1 | 2.9751E−02 | 0.0000E+00 | 0.0000E+00 | 0.0000E+00 | 0.0000E+00 | / |
| R2 | 8.4472E+00 | 0.0000E+00 | 0.0000E+00 | 0.0000E+00 | 0.0000E+00 | / |
| R3 | 9.1118E−01 | 0.0000E+00 | 0.0000E+00 | 0.0000E+00 | 0.0000E+00 | / |
| R4 | −2.5965E+00 | 0.0000E+00 | 0.0000E+00 | 0.0000E+00 | 0.0000E+00 | / |
| R5 | −3.6261E+00 | 0.0000E+00 | 0.0000E+00 | 0.0000E+00 | 0.0000E+00 | / |
| R6 | 1.8391E+03 | 0.0000E+00 | 0.0000E+00 | 0.0000E+00 | 0.0000E+00 | / |
| R7 | 1.9898E+02 | 0.0000E+00 | 0.0000E+00 | 0.0000E+00 | 0.0000E+00 | / |
| R8 | −1.9652E+01 | 0.0000E+00 | 0.0000E+00 | 0.0000E+00 | 0.0000E+00 | / |
| R9 | 6.1046E+01 | 3.1133E−06 | −2.2877E−07 | 9.9897E−09 | −1.9631E−10 | / |
| R10 | 6.3040E+00 | 5.5468E−10 | −1.1480E−11 | 1.0669E−13 | 0.0000E+00 | / |
| R11 | −1.0373E+00 | −1.5176E−10 | 5.5664E−12 | −1.0805E−13 | 8.7643E−16 | / |
| R12 | 1.6752E+02 | −3.1436E−11 | 8.2326E−13 | −1.2455E−14 | 8.3133E−17 | / |
| R13 | −5.7838E−01 | 8.4111E−13 | −1.1099E−14 | 8.7303E−17 | −3.1019E−19 | / |
| R14 | −1.0019E+00 | −4.1625E−14 | 3.9970E−16 | −2.2086E−18 | 5.1946E−21 | / |

Figure 14:
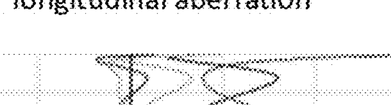
FIG. 14 is a schematic diagram of longitudinal aberration of the camera optical lens shown in FIG. 13.
Figure 14:
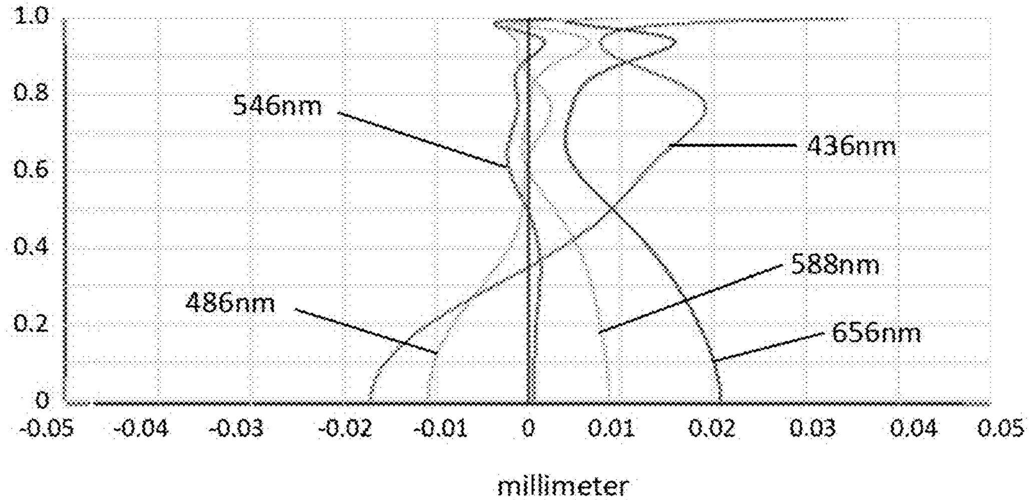
Figure 15:
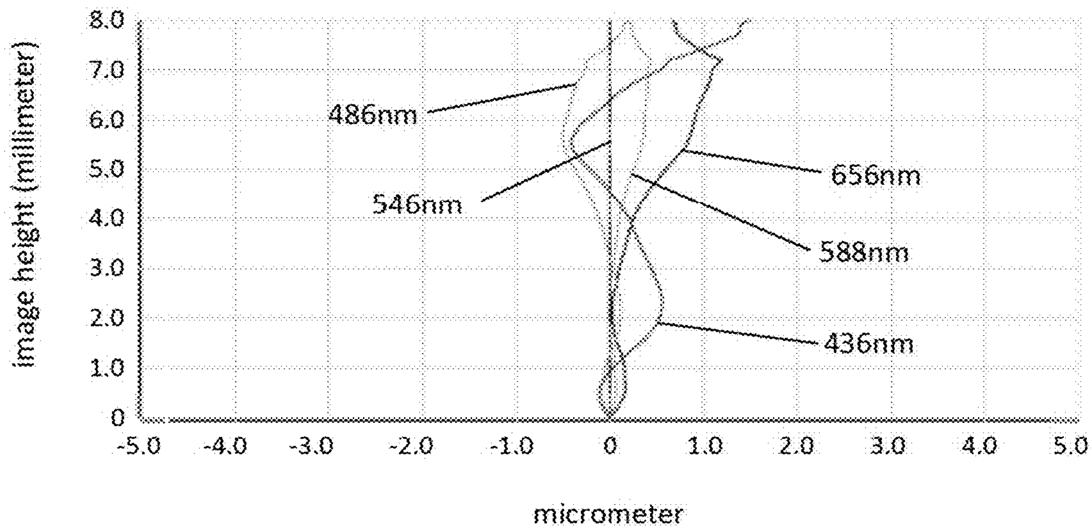
FIG. 15 is a schematic diagram of lateral color of the camera optical lens shown in FIG. 13.
Figure 16:
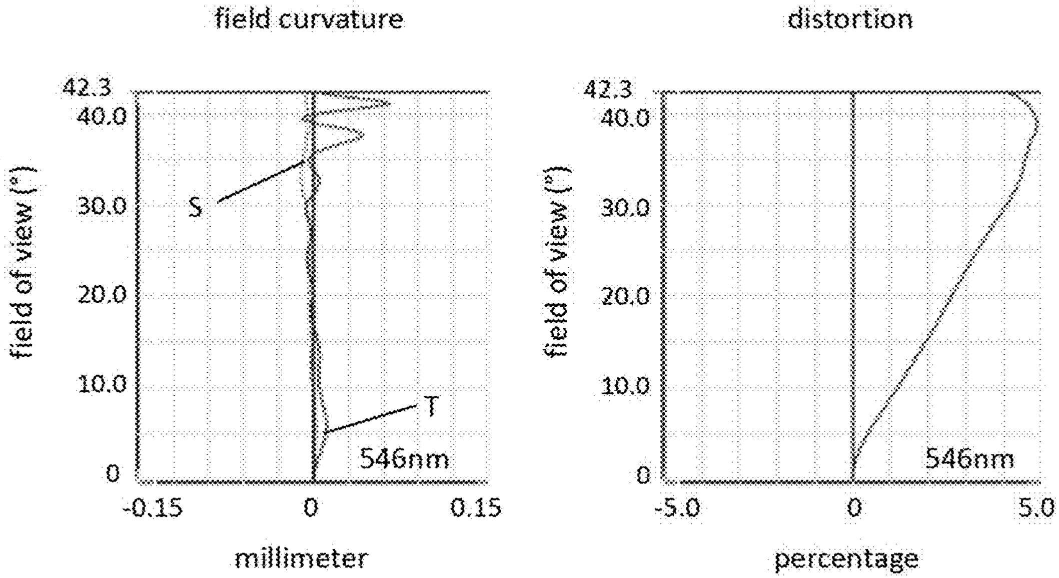
FIG. 16 is a schematic diagram of field curvature and distortion of the camera optical lens shown in FIG. 13.

FIG. 14 and FIG. 15 respectively show longitudinal aberration and lateral color of light with wavelengths of 656 nm, 588 nm, 546 nm, 486 nm and 436 nm after passing through the camera optical lens 40 according to Embodiment 4. FIG. 16 shows field curvature and distortion of light with a wavelength of 546 nm after passing through the camera optical lens 40 according to Embodiment 4. The field curvature S in FIG. 16 is the field curvature in the sagittal direction, and T is the field curvature in the meridian direction.

In this embodiment, the entrance pupil diameter ENPD of the camera optical lens 40 is 4.826 mm, the full field of view (1.0 field of view) image height IH is 8.000 mm, the field of view FOV the full field of view (1.0 field of view) in a diagonal direction is 84.58°, the MIC field of view image height is 8.150 mm, field of view FOV of MIC field of view in the diagonal direction is 85.93°, the camera optical lens 40 meets the design requirements of wide-angle, low sensitivity, good processability, miniaturization sufficient correction of aberration, and excellent imaging performance.

Table 9 shows various values in Embodiment 1, Embodiment 2, Embodiment 3, and Embodiment 4 and values corresponding to parameters specified in the relational expressions.

TABLE 9

| Parameters and Relational Expressions | Embodiment 1 | Embodiment 2 | Embodiment 3 | Embodiment 4 |
|---|---|---|---|---|
| (f4 − f5)/f1 | 8.465 | 11.990 | 8.300 | 5.474 |
| (R3 + R4)/f | 2.767 | 2.119 | 2.600 | 2.207 |
| (R9 + R10)/d9 | 29.734 | 20.503 | 35.184 | 39.997 |
| (f2 − f3)/f | −5.910 | −3.000 | −6.500 | −7.353 |
| H0.6r9/IH | 0.244 | 0.285 | 0.216 | 0.217 |
| f1/H0.6r1*tan(semi-FOV) | 23.925 | 19.452 | 22.860 | 25.071 |
| (H0.6r14/d13)*(f7/f) | −4.633 | −5.191 | −3.809 | −4.725 |
| R1/R2 | 0.341 | 0.269 | 0.279 | 0.285 |
| d5/(d4 + d6) | 0.433 | 0.440 | 0.381 | 0.404 |
| R5/R6 | −2.778 | −0.249 | −0.288 | −0.292 |
| f5/f | −5.634 | −9.484 | −6.474 | −3.848 |
| f | 8.518 | 8.419 | 8.477 | 8.446 |
| f1 | 10.136 | 9.31 | 9.712 | 9.746 |
| f2 | −88.341 | −60.871 | −90.936 | −98.118 |
| f3 | −37.997 | −35.614 | −35.839 | −36.014 |
| f4 | 37.808 | 31.784 | 25.733 | 20.849 |
| f5 | −47.993 | −79.846 | −54.876 | −32.496 |
| f6 | 7.617 | 8.517 | 9.144 | 8.849 |
| f7 | −6.635 | −6.049 | −6.081 | −6.057 |
| FNO | 1.750 | 1.750 | 1.750 | 1.750 |
| TTL | 10.150 | 10.135 | 10.199 | 10.201 |

Those skilled in the art can understand that the above embodiments are specific embodiments for implementing the present disclosure, and in practical applications, various changes may be made in form and detail without departing from the spirit and scope of the present disclosure.

What is claimed is:

1. A camera optical lens, sequentially comprising seven lenses from an object side to an image side: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power;

an object-side surface of the first lens is convex in a paraxial region, and an image-side surface of the first lens is concave in the paraxial region; an object-side surface of the second lens is convex in the paraxial region, and an image-side surface of the second lens is concave in the paraxial region; an object-side surface of the third lens is concave in the paraxial region, and an image-side surface of the third lens is concave in the paraxial region; an object-side surface of the fourth lens is convex in the paraxial region, and an image-side surface of the fourth lens is convex in the paraxial region; an object-side surface of the fifth lens is convex in the paraxial region, and an image-side surface of the fifth lens is concave in the paraxial region; an object-side surface of the sixth lens is convex in the paraxial region, and an image-side surface of the sixth lens is convex in the paraxial region; an object-side surface of the seventh lens is convex in the paraxial region, and an image-side surface of the seventh lens is concave in the paraxial region;

wherein the camera optical lens has a focal length of f, the first lens has a focal length of f1, the second lens has a focal length of f2, the third lens has a focal length of f3, the fourth lens has a focal length of f4, the fifth lens has a focal length of f5, the seventh lens has a focal length of f7, the object-side surface of the second lens has a central curvature radius of R3, the image-side surface of the second lens has a central curvature radius of R4, the object-side surface of the fifth lens has a central curvature radius of R9, the image-side surface of the fifth lens has a central curvature radius of R10, the fifth lens has an on-axis thickness of d9, the seventh lens has an on-axis thickness of d13, a radial height of an intersection point between a chief ray of 0.6 field of view of the camera optical lens and the object-side surface of the first lens is H0.6r1, a radial height of an intersection point between a chief ray of 0.6 field of view of the camera optical lens and the object-side surface of the fifth lens is H0.6r9, a radial height of an intersection point between a chief ray of 0.6 field of view of the camera optical lens and the image-side surface of the seventh lens is H0.6r14, an image height of the 1.0 field of view of the camera optical lens is IH, and half of the 1.0 field of view of the camera optical lens is semi-FOV, and following relational expressions are satisfied:

$$5.00 \leq (f4 - f5)/f1 \leq 12.00;$$

$$2.10 \leq (R3 + R4)/f \leq 3.50;$$

$$20.00 \leq (R9 + R10)/d9 \leq 40.00;$$

$$-9.00 \leq (f2 - f3)/f \leq -3.00;$$

$$0.20 \leq H0.6r9/IH \leq 0.30;$$

$$16.00 \leq f1/H0.6r1 * \tan(\text{semi} - FOV) \leq 30.00; \text{ and}$$

$$-6.00 \leq (H0.6r14/d13) * (f7/f) \leq -3.00.$$

2. The camera optical lens as described in claim 1, wherein following relational expression is satisfied: 2.10≤(R3+R4)/f≤2.90.

3. The camera optical lens as described in claim 1, wherein following relational expression is satisfied: −7.70≤(f2−f3)/f≤−3.00.

4. The camera optical lens as described in claim 1, wherein following relational expression is satisfied: 19.00≤f1/H0.6r1*tan(semi-FOV)≤25.50.

5. The camera optical lens as described in claim 1, wherein following relational expression is satisfied: −5.30≤(H0.6r14/d13)*(f7/f)≤−3.70.

6. The camera optical lens as described in claim 1, wherein a focal length of the sixth lens has a focal length of f6, and a relational expression is satisfied: −1.80≤f6/f7≤−0.90.

7. The camera optical lens as described in claim 6, wherein following relational expression is satisfied: −1.55≤f6/f7≤−1.10.

8. The camera optical lens as described in claim 1, wherein the first lens is made of a glass material.

9. A camera optical lens, sequentially comprising seven lenses from an object side to an image side: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power;

an object-side surface of the first lens is convex in a paraxial region, and an image-side surface of the first lens is concave in the paraxial region; an object-side surface of the second lens is convex in the paraxial region, and an image-side surface of the second lens is concave in the paraxial region; an object-side surface of the third lens is concave in the paraxial region, and an image-side surface of the third lens is concave in the paraxial region; an object-side surface of the fourth lens is convex in the paraxial region, and an image-side surface of the fourth lens is convex in the paraxial region; an object-side surface of the fifth lens is convex in the paraxial region, and an image-side surface of the fifth lens is concave in the paraxial region; an object-side surface of the sixth lens is convex in the paraxial region, and an image-side surface of the sixth lens is convex in the paraxial region; an object-side surface of the seventh lens is convex in the paraxial region, and an image-side surface of the seventh lens is concave in the paraxial region;

wherein the camera optical lens has a focal length of f, the first lens has a focal length of f1, the fifth lens has a focal length of f5, the seventh lens has a focal length of f7, the object-side surface of the first lens has a central curvature radius of R1, the image-side surface of the first lens has a central curvature radius of R2, the object-side surface of the third lens has a central curvature radius of R5, the third lens has a central curvature radius of R6, an on-axis thickness from the image-side surface of the second lens to the object side of the third lens is d4, the third lens has an on-axis thickness of d5, an on-axis thickness from the image-side surface of the third lens to the object-side surface of the fourth lens is d6 the seventh lens has an on-axis thickness of d13, a radial height of the intersection point between a chief ray of 0.6 field of view of the camera optical lens and the object-side surface object-side surface of the first lens is H0.6r1, a radial height of the intersection point between a chief ray of 0.6 field of view of the camera optical lens and the object-side surface object-side surface of the fifth lens is H0.6r9, a radial height of the intersection point between chief ray of 0.6 field of view of the camera optical lens and the image-side surface image-side surface of the seventh lens is H0.6r14, an image height of the 1.0 field of view of the camera optical lens is IH, and half of the 1.0 field of view of the camera optical lens is semi-FOV, and the following relational expressions are satisfied:

$$0.20 \le H0.6r9/IH \le 0.30;$$

$$16.00 \le f1/H0.6r1 * \tan(\text{semi}-FOV) \le 30.00;$$

$$-6.00 \le (H0.6r14/d13) * (f7/f) \le -3.00;$$

$$0.21 \le R1/R2 \le 0.42;$$

$$0.30 \le d5/(d4+d6) \le 0.55;$$

$$-3.45 \le R5/R6 \le -0.20; \text{ and}$$

$$-11.60 \le f5/f \le -3.00.$$

10. The camera optical lens as described in claim 9, wherein following relational expression is satisfied: 0.25≤R1/R2≤0.35.

11. The camera optical lens as described in claim 9, wherein following relational expression is satisfied: 0.35≤d5/(d4+d6)≤0.45.

12. The camera optical lens as described in claim 9, wherein following relational expression is satisfied: −2.85≤R5/R6≤−0.20.

13. The camera optical lens as described in claim 9, wherein following relational expression is satisfied: −10.00≤f5/f≤−3.50.

14. The camera optical lens as described in claim 9, wherein following relational expression is satisfied: 19.00≤f1/H0.6r1*tan(semi-FOV)≤25.50.

15. The camera optical lens as described in claim 9, wherein following relational expression is satisfied: −5.30≤(H0.6r14/d13)*(f7/f)≤−3.70.

16. The camera optical lens as described in claim 9, wherein following relational expression is satisfied: 1.00≤f1/f≤1.40.

17. The camera optical lens as described in claim 16, wherein following relational expression is satisfied: 1.05≤f1/f≤1.25.

18. The camera optical lens as described in claim 9, wherein the first lens has an on-axis thickness of d1, and the camera optical lens has a total optical length of TTL, and following relational expression is satisfied: 0.09≤d1/TTL≤0.16.

19. The camera optical lens as described in claim 18, wherein following relational expression is satisfied: 0.10≤d1/TTL≤0.14.

20. The camera optical lens as described in claim 9, wherein the first lens is made of a glass material.

* * * * *